(12) United States Patent
Maki et al.

(10) Patent No.: US 11,711,178 B2
(45) Date of Patent: Jul. 25, 2023

(54) MEASUREMENT APPARATUS AND MEASUREMENT METHOD

(71) Applicant: Panasonic Intellectual Property Corporation of America, Torrance, CA (US)

(72) Inventors: Shotaro Maki, Tokyo (JP); Hidetoshi Suzuki, Kanagawa (JP); Lilei Wang, Beijing (CN)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 17/669,954

(22) Filed: Feb. 11, 2022

(65) Prior Publication Data
US 2022/0166565 A1 May 26, 2022

Related U.S. Application Data

(63) Continuation of application No. 16/603,924, filed as application No. PCT/CN2017/082338 on Apr. 28, 2017, now Pat. No. 11,283,557.

(51) Int. Cl.
*H04L 1/24* (2006.01)
*H04L 25/02* (2006.01)
(Continued)

(52) U.S. Cl.
CPC ............ *H04L 1/24* (2013.01); *H04L 25/0224* (2013.01); *H04L 25/03* (2013.01); *H04L 27/364* (2013.01)

(58) Field of Classification Search
None
See application file for complete search history.

(56) References Cited

U.S. PATENT DOCUMENTS 4,295,140 A * 10/1981 Frosch ............... G01R 29/0892
455/60
4,402,023 A * 8/1983 Hiraguri ................ G11B 5/588
360/77.14
(Continued)

FOREIGN PATENT DOCUMENTS

CA 3044093 A1 * 5/2018 ........... H04B 7/0456
CA 3046031 A1 * 7/2018 ......... H04L 27/2601
(Continued)

OTHER PUBLICATIONS

Y. Qi, M. Hunukumbure, H. Nam, H. Yoo and S. Amuru, "On the Phase Tracking Reference Signal (PT-RS) Design for 5G New Radio (NR)," 2018 IEEE 88th Vehicular Technology Conference (VTC-Fall), 2018, pp. 1-5, doi: 10.1109/VTCFall.2018.8690852. (Year: 2018).*

(Continued)

*Primary Examiner* — Berhanu Tadese
(74) *Attorney, Agent, or Firm* — Seed IP Law Group LLP

(57) ABSTRACT

An EVM measurement value is appropriately determined while CPE/ICI correction is taken into account. In a measurement apparatus (300), an EVM measurer (305) measures a modulation quality of a signal transmitted from a transmission apparatus. An EVM determiner (306) determines whether or not the measurement value of the modulation quality is equal to or less than a first requirement value, in a case where correction relating to a phase noise of the transmission apparatus is necessary in a reception apparatus. The first requirement value herein is higher than a second requirement value used in the determination of the measurement value in a case where the correction relating to the phase noise of the transmission apparatus is unnecessary in the reception apparatus.

4 Claims, 17 Drawing Sheets

(51) Int. Cl.
  *H04L 25/03* (2006.01)
  *H04L 27/36* (2006.01)

(56) References Cited

U.S. PATENT DOCUMENTS

| | | | | |
|---|---|---|---|---|
| 6,456,671 | B1* | 9/2002 | Patire | H04L 27/2273 375/325 |
| 6,703,897 | B2* | 3/2004 | O'Flaherty | H03F 1/0244 330/285 |
| 6,898,198 | B1* | 5/2005 | Ryan | H04L 1/0015 370/332 |
| 6,940,843 | B2* | 9/2005 | Goodall | H04L 1/0002 370/332 |
| 7,062,703 | B1* | 6/2006 | Keaney | H04L 1/0072 714/811 |
| 7,397,758 | B1* | 7/2008 | Hart | H04L 25/0228 370/480 |
| 7,397,871 | B2* | 7/2008 | Wiss | H04L 1/20 375/346 |
| 7,411,935 | B2* | 8/2008 | Ryan | H04W 48/20 370/332 |
| 7,460,512 | B2* | 12/2008 | Goodall | H04W 48/20 370/332 |
| 7,519,383 | B2* | 4/2009 | Olgaard | H04B 17/21 370/333 |
| 7,623,703 | B2* | 11/2009 | Hahn | H04N 5/21 358/1.9 |
| 7,821,915 | B2* | 10/2010 | Hart | H04L 25/0228 370/208 |
| 7,826,521 | B1 | 11/2010 | Sun et al. | |
| 7,849,391 | B2* | 12/2010 | Keaney | H04L 1/0045 714/811 |
| 7,929,507 | B2* | 4/2011 | Goodall | H04B 17/318 370/332 |
| 7,990,224 | B2* | 8/2011 | Griffin | H03L 7/091 331/25 |
| 8,018,883 | B2* | 9/2011 | Bowser | H04L 63/1441 370/310.1 |
| 8,036,298 | B2* | 10/2011 | Kim | H04L 1/20 375/267 |
| 8,116,363 | B2* | 2/2012 | Shafeeu | H04L 27/364 375/296 |
| 8,331,484 | B2* | 12/2012 | Silverman | H04L 25/03343 375/296 |
| 8,488,655 | B2* | 7/2013 | Batra | H04W 74/0816 375/221 |
| 8,542,767 | B2* | 9/2013 | Silverman | H04L 25/03343 375/296 |
| 8,571,139 | B2* | 10/2013 | Polaert | H04L 27/22 375/322 |
| 8,634,498 | B2* | 1/2014 | Mueller | H04B 17/336 379/403 |
| 8,798,069 | B2* | 8/2014 | Gates | H04W 72/542 370/392 |
| 8,837,390 | B2* | 9/2014 | Yu | H04L 5/143 455/423 |
| 9,002,299 | B2* | 4/2015 | Perahia | H04L 25/03343 455/67.11 |
| 9,036,614 | B2* | 5/2015 | Batra | H04W 74/0816 370/338 |
| 9,055,529 | B2* | 6/2015 | Shih | H03F 3/24 |
| 9,210,062 | B2* | 12/2015 | Mueller | H04B 17/336 |
| 9,287,943 | B2 | 3/2016 | Lee et al. | |
| 9,295,016 | B2* | 3/2016 | Tan | H04L 5/0003 |
| 9,337,782 | B1* | 5/2016 | Mauer | H04L 25/03343 |
| 9,344,897 | B2* | 5/2016 | Zhang | H04L 25/0228 |
| 9,413,299 | B2* | 8/2016 | Camuffo | H03F 1/0233 |
| 9,510,138 | B2* | 11/2016 | Batra | H04L 72/0453 |
| 9,603,130 | B2* | 3/2017 | Joung | H04L 1/1812 |
| 9,813,267 | B1 | 11/2017 | Barghi | |
| 9,893,819 | B1* | 2/2018 | Lee | H04B 17/102 |
| 9,942,858 | B1* | 4/2018 | Merlin | H04W 52/283 |
| 9,948,410 | B2* | 4/2018 | Goetz | H04B 17/17 |
| 10,079,626 | B1 | 9/2018 | Olgaard et al. | |
| 10,638,489 | B2* | 4/2020 | Noh | H04W 72/541 |
| 10,659,119 | B2* | 5/2020 | Li | H04L 5/0048 |
| 10,727,998 | B2* | 7/2020 | Zhang | H04L 5/0048 |
| 10,735,983 | B2* | 8/2020 | Yoo | H04L 5/0057 |
| 10,820,331 | B2* | 10/2020 | Yoo | H04L 5/005 |
| 10,862,644 | B2* | 12/2020 | Li | H04L 25/0228 |
| 10,938,610 | B2* | 3/2021 | Li | H04L 5/0048 |
| 10,958,395 | B2* | 3/2021 | Kuchi | H04L 27/26526 |
| 10,965,414 | B2* | 3/2021 | Zhong | H04W 72/04 |
| 11,018,920 | B2* | 5/2021 | Saito | H04L 27/261 |
| 11,050,595 | B2* | 6/2021 | Ciochina-Duchesne | H04L 27/26134 |
| 11,082,179 | B2* | 8/2021 | Chen | H04L 5/00 |
| 11,088,901 | B2* | 8/2021 | Sun | H04L 5/0091 |
| 11,102,789 | B2* | 8/2021 | Zhang | H04W 72/21 |
| 11,146,370 | B2* | 10/2021 | Xu | H04L 27/261 |
| 11,153,134 | B2* | 10/2021 | Sun | H04L 25/02 |
| 11,177,904 | B2* | 11/2021 | Zhang | H04L 5/0007 |
| 11,229,017 | B2* | 1/2022 | Zhang | H04L 5/0057 |
| 11,277,238 | B2* | 3/2022 | Chen | H04L 27/26 |
| 11,283,557 | B2* | 3/2022 | Maki | H04L 1/24 |
| 11,283,572 | B2* | 3/2022 | Werner | H04L 27/2613 |
| 11,323,917 | B2* | 5/2022 | Yokomakura | H04L 27/2698 |
| 11,343,057 | B2* | 5/2022 | Zhang | H04W 72/23 |
| 11,362,781 | B2* | 6/2022 | Zhang | H04L 5/0005 |
| 11,375,462 | B2* | 6/2022 | Hunukumbure | H04W 52/42 |
| 2001/0038674 | A1 | 11/2001 | Trans | |
| 2003/0016770 | A1 | 1/2003 | Trans et al. | |
| 2006/0153151 | A1* | 7/2006 | Huang | H04W 52/362 370/338 |
| 2007/0018718 | A1* | 1/2007 | Horng | H03F 1/0227 330/10 |
| 2007/0291873 | A1 | 12/2007 | Saito et al. | |
| 2007/0297537 | A1 | 12/2007 | Luce | |
| 2008/0075205 | A1 | 3/2008 | Lee et al. | |
| 2008/0298449 | A1* | 12/2008 | Yokoyama | H04L 1/24 375/227 |
| 2008/0303820 | A1* | 12/2008 | Schachner | G01R 13/0236 345/440.1 |
| 2009/0175181 | A1 | 7/2009 | Kim et al. | |
| 2009/0252269 | A1 | 10/2009 | Gunturi et al. | |
| 2009/0258612 | A1 | 10/2009 | Zhuang et al. | |
| 2009/0268571 | A1* | 10/2009 | Kobayashi | G11B 7/126 |
| 2010/0098139 | A1 | 4/2010 | Braithwaite | |
| 2010/0202301 | A1* | 8/2010 | Wen | H04L 43/16 370/252 |
| 2010/0234035 | A1 | 9/2010 | Fujishima et al. | |
| 2010/0273520 | A1 | 10/2010 | Pelletier et al. | |
| 2010/0315138 | A1 | 12/2010 | Namba et al. | |
| 2011/0038283 | A1 | 2/2011 | Yu et al. | |
| 2011/0141934 | A1 | 6/2011 | Aoki | |
| 2011/0150127 | A1 | 6/2011 | Calabro et al. | |
| 2013/0141160 | A1 | 6/2013 | Ohkawara et al. | |
| 2013/0142236 | A1 | 6/2013 | Lee et al. | |
| 2013/0238262 | A1 | 9/2013 | Asami | |
| 2013/0279629 | A1 | 10/2013 | Seller | |
| 2014/0169434 | A1 | 6/2014 | Hewavithana et al. | |
| 2014/0177686 | A1 | 6/2014 | Greene et al. | |
| 2014/0274191 | A1 | 9/2014 | Scholand et al. | |
| 2014/0334421 | A1 | 11/2014 | Sosa et al. | |
| 2014/0348254 | A1 | 11/2014 | Lee et al. | |
| 2014/0362951 | A1 | 12/2014 | Fehri et al. | |
| 2015/0124672 | A1 | 5/2015 | Lindoff et al. | |
| 2015/0270993 | A1 | 9/2015 | Cheung | |
| 2015/0372728 | A1 | 12/2015 | Rahman et al. | |
| 2015/0372847 | A1 | 12/2015 | Dhayni | |
| 2016/0043889 | A1 | 2/2016 | Lozhkin | |
| 2016/0066202 | A1 | 3/2016 | Dayanandan et al. | |
| 2016/0095055 | A1 | 3/2016 | Sarrigeorgidis et al. | |
| 2016/0218891 | A1 | 7/2016 | Nammi et al. | |
| 2016/0366007 | A1 | 12/2016 | Hwang et al. | |
| 2016/0373990 | A1 | 12/2016 | Lim et al. | |
| 2016/0380682 | A1* | 12/2016 | Sienkiewicz | H04B 7/0848 375/267 |
| 2017/0086148 | A1 | 3/2017 | Jung et al. | |
| 2017/0099669 | A1 | 4/2017 | Jung et al. | |
| 2017/0214518 | A1 | 7/2017 | Oh et al. | |

(56) References Cited

U.S. PATENT DOCUMENTS

| | | | |
|---|---|---|---|
| 2017/0238232 A1* | 8/2017 | Yang | H04L 5/0007 370/328 |
| 2017/0311284 A1 | 10/2017 | Basu Mallick et al. | |
| 2017/0318478 A1 | 11/2017 | Basu Mallick et al. | |
| 2017/0325049 A1 | 11/2017 | Basu Mallick et al. | |
| 2018/0132122 A1* | 5/2018 | Yoo | H04W 24/08 |
| 2018/0132257 A1 | 5/2018 | Golitschek Edler Von Elbwart et al. | |
| 2018/0198651 A1 | 7/2018 | Kundargi et al. | |
| 2018/0205528 A1* | 7/2018 | Bai | H04L 5/0092 |
| 2018/0227929 A1* | 8/2018 | Yoo | H04L 5/005 |
| 2019/0222386 A1* | 7/2019 | Guo | H04L 5/0094 |
| 2019/0356437 A1 | 11/2019 | Zhong et al. | |
| 2020/0067669 A1* | 2/2020 | Tang | H04W 72/23 |
| 2020/0127776 A1* | 4/2020 | Maki | H04L 25/03 |
| 2020/0136748 A1 | 4/2020 | Beeri et al. | |
| 2020/0153586 A1* | 5/2020 | Bai | H04W 72/12 |
| 2020/0235979 A1* | 7/2020 | Yokomakura | H04L 27/2636 |
| 2021/0050977 A1* | 2/2021 | Bai | H04W 72/12 |
| 2021/0126759 A1* | 4/2021 | Chen | H04L 5/0078 |
| 2021/0152199 A1 | 5/2021 | Meilhac et al. | |
| 2021/0218532 A1* | 7/2021 | Yunusov | H04L 27/0014 |
| 2021/0320841 A1* | 10/2021 | Sun | H04L 41/0803 |
| 2021/0377929 A1* | 12/2021 | Li | H04L 5/0082 |
| 2021/0385113 A1* | 12/2021 | Sun | H04L 5/0048 |
| 2022/0109537 A1* | 4/2022 | Zewail | H04L 5/0051 |
| 2022/0166565 A1* | 5/2022 | Maki | H04L 25/03 |
| 2022/0166578 A1* | 5/2022 | Chen | H04L 5/0007 |

FOREIGN PATENT DOCUMENTS

| | | | | |
|---|---|---|---|---|
| CA | 3049495 A1 * | 7/2018 | | H04L 1/0003 |
| CA | 3057546 A1 * | 9/2018 | | H04L 1/0003 |
| CA | 3057550 A1 * | 9/2018 | | H04B 7/0626 |
| CA | 3032798 A1 * | 10/2018 | | H04B 1/10 |
| CN | 101808066 A * | 8/2010 | | |
| CN | 102546036 A * | 7/2012 | | |
| CN | 102571216 A * | 7/2012 | | |
| CN | 101483496 B * | 10/2012 | | H04L 1/0015 |
| CN | 101534159 B * | 3/2013 | | |
| CN | 103841058 A | 6/2014 | | |
| CN | 104836580 A * | 8/2015 | | H03C 3/0925 |
| CN | 108259143 A * | 7/2018 | | H04B 7/0456 |
| CN | 108259145 A * | 7/2018 | | H04L 5/0048 |
| CN | 108282280 A * | 7/2018 | | H04L 41/0803 |
| CN | 108282281 A * | 7/2018 | | H04L 1/0003 |
| CN | 108282295 A * | 7/2018 | | H04L 5/0048 |
| CN | 108282431 A * | 7/2018 | | H04L 27/2695 |
| CN | 108282877 A * | 7/2018 | | H04L 1/0003 |
| CN | 108289069 A * | 7/2018 | | H04L 27/261 |
| CN | 108631987 A * | 10/2018 | | H04L 5/0023 |
| CN | 108632009 A * | 10/2018 | | H04L 1/0003 |
| CN | 108633037 A * | 10/2018 | | H04B 17/104 |
| CN | 108667577 A * | 10/2018 | | H04L 5/0005 |
| CN | 108737058 A * | 11/2018 | | H04L 1/0003 |
| CN | 109478993 A * | 3/2019 | | H04L 1/00 |
| CN | 108737058 B * | 7/2019 | | H04L 1/0003 |
| CN | 110192373 A * | 8/2019 | | H04L 27/2601 |
| CN | 110214466 A * | 9/2019 | | H04L 1/0003 |
| CN | 110249599 A * | 9/2019 | | H04L 27/26 |
| CN | 110419203 A * | 11/2019 | | H04L 27/2607 |
| CN | 110463099 A * | 11/2019 | | H04B 1/10 |
| CN | 110463130 A * | 11/2019 | | H04L 5/0007 |
| CN | 110521164 A * | 11/2019 | | H04L 1/001 |
| CN | 110537351 A * | 12/2019 | | H04L 1/24 |
| CN | 110622454 A * | 12/2019 | | H04L 1/0003 |
| CN | 108259143 B * | 2/2020 | | H04B 7/0456 |
| CN | 108282281 B * | 2/2020 | | H04L 1/0003 |
| CN | 104836580 B * | 4/2020 | | H03C 3/0925 |
| CN | 108259145 B * | 5/2020 | | H04L 5/0048 |
| CN | 108282431 B * | 6/2020 | | H04L 27/2695 |
| CN | 108259401 B * | 9/2020 | | H04B 7/0456 |
| CN | 108289069 B * | 10/2020 | | H04L 27/261 |
| CN | 112448805 A * | 3/2021 | | H04L 1/0003 |
| CN | 112654089 A * | 4/2021 | | H04L 1/0003 |
| CN | 108282295 B * | 6/2021 | | H04L 5/0048 |
| CN | 108282280 B * | 7/2021 | | H04L 41/0803 |
| CN | 108667577 B * | 8/2021 | | H04L 5/0005 |
| CN | 113206730 A * | 8/2021 | | H04B 7/0456 |
| CN | 108924920 B * | 9/2021 | | H04W 52/146 |
| CN | 110463099 B * | 1/2022 | | H04B 1/10 |
| CN | 112654089 B * | 2/2022 | | H04L 1/0003 |
| CN | 108631987 B * | 5/2022 | | H04L 5/0023 |
| CN | 110537351 B * | 5/2022 | | H04L 1/24 |
| CN | 110419203 B * | 7/2022 | | H04L 27/2607 |
| DE | 102011089867 A1 * | 7/2012 | | H03L 7/085 |
| DE | 112017006682 T5 * | 12/2019 | | H04B 7/02 |
| EP | 1601129 A1 * | 11/2005 | | H04L 27/364 |
| EP | 1601129 B1 * | 9/2008 | | H04L 27/364 |
| EP | 2 639 983 A1 | 9/2013 | | |
| EP | 2 846 504 A1 | 3/2015 | | |
| EP | 3379787 A1 * | 9/2018 | | H04L 27/2607 |
| EP | 3407523 A1 * | 11/2018 | | H04L 1/0003 |
| EP | 3407523 A4 * | 4/2019 | | H04L 1/0003 |
| EP | 3480993 A1 * | 5/2019 | | H04L 1/00 |
| EP | 3565161 A1 * | 11/2019 | | H04B 7/0456 |
| EP | 3567785 A1 * | 11/2019 | | H04L 1/0003 |
| EP | 3568939 A2 * | 11/2019 | | H04L 27/2601 |
| EP | 3570473 A2 * | 11/2019 | | H04B 1/10 |
| EP | 3579515 A1 * | 12/2019 | | H04L 27/26 |
| EP | 3579638 A1 * | 12/2019 | | H04L 1/0003 |
| EP | 3585117 A1 * | 12/2019 | | H04B 17/104 |
| EP | 3596871 A1 * | 1/2020 | | H04L 1/001 |
| EP | 3585117 A4 * | 2/2020 | | H04B 17/104 |
| EP | 3605924 A1 * | 2/2020 | | H04L 1/0003 |
| EP | 3605924 A4 * | 3/2020 | | H04L 1/0003 |
| EP | 3565161 A4 * | 4/2020 | | H04B 7/0456 |
| EP | 3480993 A4 * | 7/2020 | | H04L 1/00 |
| EP | 3567785 A4 * | 9/2020 | | H04L 1/0003 |
| EP | 3579515 A4 * | 12/2020 | | H04L 27/26 |
| EP | 3579638 A4 * | 12/2020 | | H04L 1/0003 |
| EP | 3407523 B1 * | 1/2021 | | H04L 1/0003 |
| EP | 3570473 A4 * | 1/2021 | | H04B 1/10 |
| EP | 3565161 B1 * | 4/2021 | | H04B 7/0456 |
| EP | 3852299 A1 * | 7/2021 | | H04L 1/0003 |
| EP | 3860028 A1 * | 8/2021 | | H04L 1/0003 |
| EP | 3568939 B1 * | 10/2021 | | H04L 27/2601 |
| EP | 3605924 B1 * | 10/2021 | | H04L 1/0003 |
| EP | 3937416 A1 * | 1/2022 | | H04L 27/2601 |
| EP | 3596871 B1 * | 4/2022 | | H04L 1/001 |
| ES | 2896800 T3 * | 2/2022 | | H04L 27/2601 |
| GB | 2562462 A * | 11/2018 | | H04B 17/336 |
| GB | 2562462 B * | 11/2021 | | H04B 17/336 |
| JP | 01096853 A * | 4/1989 | | |
| JP | 01300456 A * | 12/1989 | | |
| JP | 03054920 A * | 3/1991 | | |
| JP | 2000-201191 A | 7/2000 | | |
| JP | 2002-152167 A | 5/2002 | | |
| JP | 3349927 B2 * | 11/2002 | | |
| JP | 2013-187817 A | 9/2013 | | |
| JP | 6721127 B2 * | 7/2020 | | H04L 5/0016 |
| RU | 2713512 C1 * | 2/2020 | | H04L 25/0226 |
| RU | 2725704 C1 * | 7/2020 | | H04B 1/10 |
| RU | 2742820 C1 * | 2/2021 | | H04B 7/0456 |
| RU | 2019124007 A * | 3/2021 | | H04L 27/26 |
| RU | 2761513 C2 * | 12/2021 | | H04L 27/26 |
| TW | 200913497 A * | 3/2009 | | H03L 7/091 |
| WO | WO-9317723 A1 * | 9/1993 | | A61L 2/0088 |
| WO | WO-2005117322 A1 * | 12/2005 | | H04L 27/364 |
| WO | 2014/127862 A1 | 8/2014 | | |
| WO | WO-2017188591 A1 * | 11/2017 | | H04B 7/01 |
| WO | WO-2017200315 A1 * | 11/2017 | | |
| WO | WO-2017213382 A1 * | 12/2017 | | H04L 25/0204 |
| WO | WO-2018027222 A1 * | 2/2018 | | H04L 1/0004 |
| WO | WO-2018044715 A1 * | 3/2018 | | H04J 11/005 |
| WO | WO-2018070767 A1 * | 4/2018 | | H04J 11/0023 |
| WO | WO-2018088816 A1 * | 5/2018 | | H04L 1/00 |
| WO | WO-2018090327 A1 * | 5/2018 | | H04B 7/0456 |
| WO | WO-2018121671 A1 * | 7/2018 | | H04B 7/0456 |
| WO | WO-2018125910 A1 * | 7/2018 | | H04B 7/02 |
| WO | WO-2018126763 A1 * | 7/2018 | | H04L 1/0003 |
| WO | WO-2018127132 A1 * | 7/2018 | | H04L 1/0003 |
| WO | WO-2018128453 A1 * | 7/2018 | | H04B 7/0417 |

(56) References Cited

FOREIGN PATENT DOCUMENTS

| WO | WO-2018132237 | A2 | * | 7/2018 | | H04L 27/2601 |
|---|---|---|---|---|---|---|
| WO | WO-2018132237 | A3 | * | 8/2018 | | H04L 27/2601 |
| WO | WO-2018143402 | A1 | * | 8/2018 | | H04L 27/26 |
| WO | WO-2018143405 | A1 | * | 8/2018 | | H04L 1/0003 |
| WO | WO-2018143537 | A1 | * | 8/2018 | | H04L 25/0204 |
| WO | WO-2018164761 | A1 | * | 9/2018 | | H04L 1/001 |
| WO | WO-2018171491 | A1 | * | 9/2018 | | H04B 17/104 |
| WO | WO-2018171742 | A1 | * | 9/2018 | | H04L 1/0003 |
| WO | WO-2018171783 | A1 | * | 9/2018 | | H04B 7/0626 |
| WO | WO-2018171800 | A1 | * | 9/2018 | | H04L 5/0023 |
| WO | WO-2018173417 | A1 | * | 9/2018 | | H04L 27/2607 |
| WO | WO-2018174578 | A1 | * | 9/2018 | | H04B 17/336 |
| WO | WO-2018182242 | A2 | * | 10/2018 | | H04B 1/10 |
| WO | WO-2018182244 | A1 | * | 10/2018 | | H04L 5/0007 |
| WO | WO-2018182248 | A1 | * | 10/2018 | | H04L 1/00 |
| WO | 2018/195887 | A1 | | 11/2018 | | |
| WO | WO-2018164761 | A8 | * | 11/2018 | | H04L 1/001 |
| WO | WO-2018182242 | A3 | * | 11/2018 | | H04B 1/10 |
| WO | WO-2018195887 | A1 | * | 11/2018 | | H04L 1/24 |

OTHER PUBLICATIONS

V. S. Abhayawardhana and I. J. Wassell, "Common phase error correction with feedback for OFDM in wireless communication," Global Telecommunications Conference, 2002. GLOBECOM '02. IEEE, Taipei, Taiwan, 2002, pp. 651-655 vol. 1, doi: 10.1109/GLOCOM.2002.1188159. (Year: 2002).*

TS 136 104-V14.3.0-LTE; Evolved Universal Terrestrial Radio Access (E-UTRA); Base Station (BS) radio transmission and reception (3GPP TS 36.104 version 14.3.0 Release 14), Apr. 2017 (Year: 2017).*

TS 136 101-V14.3.0-LTE; Evolved Universal Terrestrial Radio Access (E-UTRA); User Equipment (UE) radio transmission and reception (3GPP TS 36.101 version 14.3.0 Release 14), Apr. 2017 (Year: 2017).*

R1-167888, Study of Phase Noise Tracking, 3GPP TSG RAN WG1 Meeting No. 86, Aug. 22-26, 2016 (Year: 2016).*

3GPP TS 36.101 V14.3.0, "3rd Generation Partnership Project; Technical Specification Group Radio Access Network; Evolved Universal Terrestrial Radio Access (E-UTRA); User Equipment (UE) radio transmission and reception (Release 14)," Mar. 2017, 1369 pages.

3GPP TS 36.104 V14.3.0, "3rd Generation Partnership Project; Technical Specification Group Radio Access Network; Evolved Universal Terrestrial Radio Access (E-UTRA); Base Station (BS) radio transmission and reception (Release 14)," Mar. 2017, 223 pages.

Ericsson, "On phase noise effects," R1-1612335, Agenda Item: 7.1.3.2, 3GPP TSG-RAN WG1 #87, Reno, Nevada, Nov. 14-18, 2016, 6 pages.

International Search Report, dated Jan. 22, 2018, for corresponding International Application No. PCT/CN2017/082338, 2 pages.

NTT Docomo, "Revision of SI: Study on New Radio Access Technology," RP-161596 (Revision of RP-161214), Agenda Item: 9.2.2, 3GPP TSG RAN Meeting #73, New Orleans, Sep. 19-22, 2016, 7 pages.

Samsung, "PT-RS design," R1-1702959, Agenda Item: 8.1.2.4.3, 3GPP TSG RAN WG1 Meeting #88, Athens, Greece, Feb. 13-17, 2017, 6 pages.

Abhayawardhana et al., "Common Phase Error Correction with Feedback for OFDM in Wireless Communication," *Global Telecommunications Conference, 2002. GLOBECOM '02. IEEE* 1:651-655, 2002.

* cited by examiner

| Modulation Scheme | EVM Requirement Value [%] | |
|---|---|---|
| | (a) When CPE/ICI correction is unnecessary | (b) When CPE/ICI correction is necessary |
| QPSK | 17.5 | 17.5 |
| 16QAM | 12.5 | 13 |
| 64QAM | 8 | 12.5 |
| 256QAM | 3.5 | 8 |

FIG. 6

| Modulation Scheme | EVM Requirement Value [%] ||
| --- | --- | --- |
| | (a) When CPE/ICI correction is unnecessary | (b) When CPE/ICI correction is necessary |
| BPSK/QPSK | 17.5 | 17.5 |
| 16QAM | 12.5 | 13 |
| 64QAM | 8 | 12.5 |

FIG. 11

| Modulation Scheme | EVM Requirement Value [%] |
|---|---|
| QPSK | 17.5 |
| 16QAM | 12.5 |
| 64QAM | 8 |
| 256QAM | 3.5 |

FIG. 15

| Modulation Scheme | EVM Requirement Value [%] |
|---|---|
| BPSK/QPSK | 17.5 |
| 16QAM | 12.5 |
| 64QAM | 8 |

FIG. 17

MEASUREMENT APPARATUS AND MEASUREMENT METHOD

TECHNICAL FIELD

The present disclosure relates to a measurement apparatus and a measurement method.

BACKGROUND ART

A communication system so called the fifth generation mobile communication system (5G) has been under study. In 5G, studies have been conducted on flexibly providing functions respectively for use cases where communication traffic increases, where the number of terminals to be connected increases, and where high reliability and/or low latency is required. There are three representative use cases, which are enhanced Mobile Broadband (eMBB), massive Machine Type Communications (mMTC), and Ultra Reliable and Low Latency Communications (URLLC). The 3rd Generation Partnership Project (3GPP), which is an international standardization organization, has been conducting studies on further evolution of the communication system from both aspects of further evolution of the LTE systems and New Radio Access Technology (RAT) (see, e.g., Non-Patent Literature (hereinafter, referred to as "NPL") 1).

CITATION LIST

Non-Patent Literature

NPL 1
RP-161596, "Revision of SI: Study on New Radio Access Technology," NTT DOCOMO, September 2016
NPL 2
R1-1612335, "On phase noise effects," Ericsson, November 2016
NPL 3
3GPP TS 36.101 V14.3.0, "User Equipment (UE) radio transmission and reception (Release 14)," March 2017
NPL 4
3GPP TS 36.104 V14.3.0, "Base station (BS) radio transmission and reception (Release 14)," March 2017

SUMMARY OF INVENTION

In New RAT, a signal of a high frequency of at least 6 GHz, for example, is used as a carrier wave compared with LTE/LTE Advanced. In particular, when a high frequency band and also a high modulation order (high-order modulation) are used, error rate characteristics degrade due to a Common Phase Error (CPE) or Inter-carrier Interference (ICI) caused by a phase noise of a local oscillator of a transmission apparatus (e.g., see NPL 2). In this respect, studies have been carried out on performing CPE correction, using a Phase Tracking Reference Signal (PT-RS) or ICI correction (hereinafter, referred to as "CPE/ICI correction"), in addition to performing channel equalization in a reception apparatus in New RAT.

There is, however, a problem in that, when an Error Vector Magnitude (EVM) (modulation quality) measurement value of a transmission apparatus is determined, the CPE/ICI correction to be performed in a reception apparatus is not taken into account under the test standards (e.g., see NPLs 3 and 4) of a base station (BS), which may be called an "eNB," and a mobile station (may be called a "terminal" or a "User Equipment (UE))" in LTE/LTE Advanced.

One non-limiting and exemplary embodiment of this disclosure facilitates providing a measurement apparatus and a measurement method each capable of appropriately determining an EVM measurement value, taking CPE/ICI correction into account.

A measurement apparatus according to an aspect of the present disclosure includes: measurement circuitry, which, in operation, measures a modulation quality of a signal transmitted from a transmission apparatus; and determination circuitry, which, in operation, determines whether or not a measurement value of the modulation quality is equal to or less than a first requirement value, in a case where correction relating to a phase noise of the transmission apparatus is necessary in a reception apparatus, the first requirement value being higher than a second requirement value used in the determination of the measurement value in a case where the correction relating to the phase noise of the transmission apparatus is unnecessary in the reception apparatus.

A measurement apparatus according to an aspect of the present disclosure includes: correction circuitry, which, in operation, performs correction relating to a phase noise for a signal transmitted from a transmission apparatus; measurement circuitry, which, in operation, measures a modulation quality of the signal after the correction relating to the phase noise; and determination circuitry, which, in operation, determines whether or not a measurement value of the modulation quality is equal to or less than a requirement value.

A measurement method according to an aspect of the present disclosure includes: measuring a modulation quality of a signal transmitted from a transmission apparatus; and determining whether or not a measurement value of the modulation quality is equal to or less than a first requirement value, in a case where correction relating to a phase noise of the transmission apparatus is necessary in a reception apparatus, the first requirement value being higher than a second requirement value used in the determining of the measurement value in a case where the correction relating to the phase noise of the transmission apparatus is unnecessary in the reception apparatus.

Note that the comprehensive or specific aspects mentioned above may be implemented by a system, an apparatus, a method, an integrated circuit, a computer program or a recoding medium, or any combination of the system, the apparatus, the method, the integrated circuit, the computer program, and the recoding medium.

According to an aspect of this disclosure, an EVM measurement value can be appropriately determined while CPE/ICI correction is taken into account.

The specification and the drawings make it clear more advantages and effects in an aspect of this disclosure. Such advantages and/or effects are provided by the features disclosed in some embodiments as well as the specification and the drawings, but all of them do not have to be provided in order to obtain one or more identical features.

BRIEF DESCRIPTION OF DRAWINGS

FIG. 6 is a table illustrating configuration examples of EVM requirement values according to Operation Example 1 of Embodiment 1;

FIG. 11 is a table illustrating configuration examples of EVM requirement values according to Operation Example 2 of Embodiment 1;

FIG. 15 is a table illustrating configuration examples of EVM requirement values according to Operation Example 1 of Embodiment 3;

FIG. 17 is a table illustrating configuration examples of EVM requirement values according to Operation Example 2 of Embodiment 3.

DESCRIPTION OF EMBODIMENTS

Hereinafter, a detailed description will be given of embodiments of the present disclosure with reference to the accompanying drawings.

The higher the frequency band to which a signal is assigned or the higher the modulation order to be used for a signal, the larger the effect of CPE/ICI on error rate characteristics is. In this respect, as described above, studies have been conducted on performing CPE/ICI correction using a PT-RS, in addition to performing channel equalization in a reception apparatus in a case where a high frequency band and/or high modulation order is used.

Figure 1:
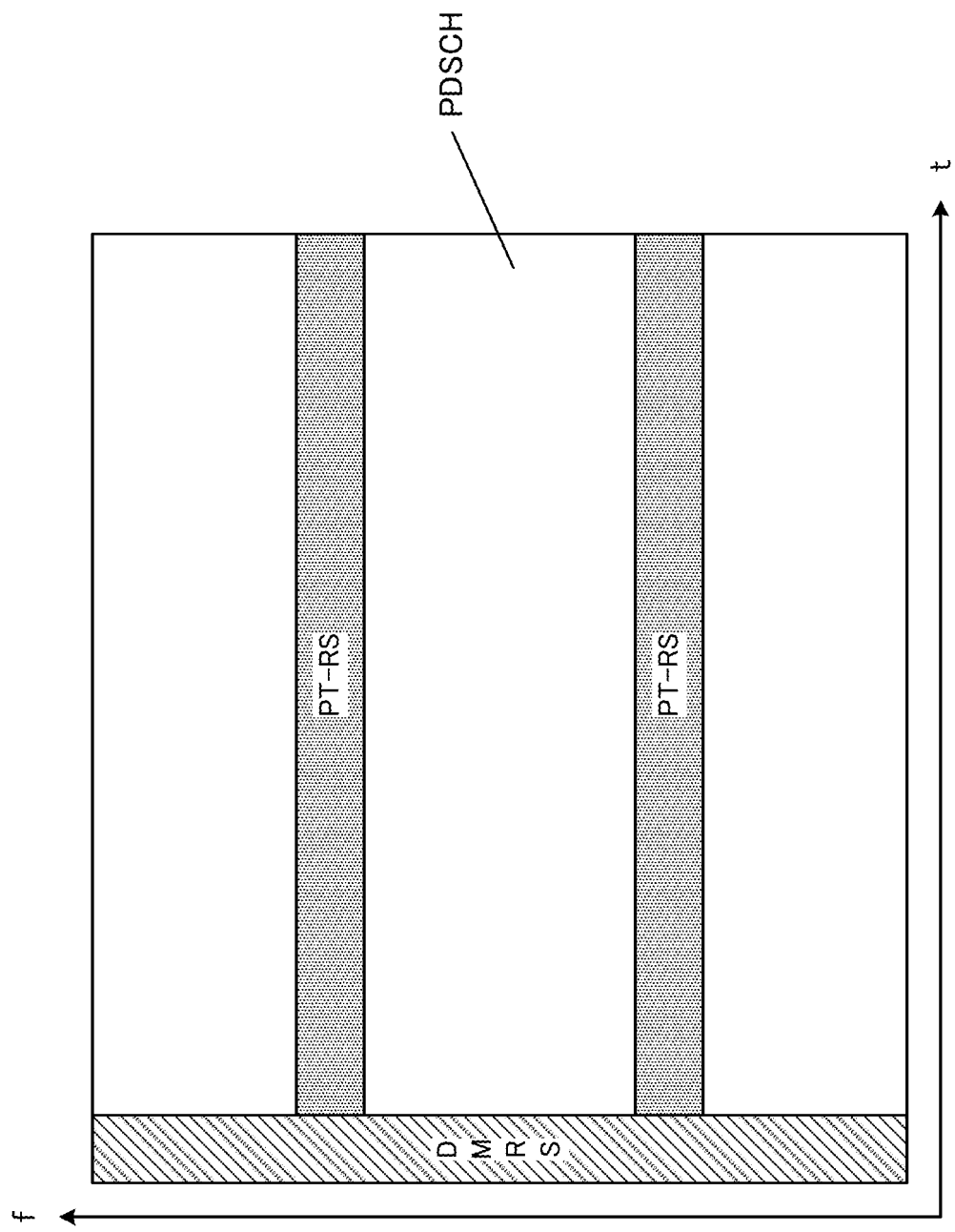
FIG. 1 is a diagram illustrating a resource mapping example for PT-RSs and a DMRS.

PT-RSs are mapped densely in the time domain compared with channel estimation reference signals (Demodulation Reference Signals (DMRSs)) in order to track CPE/ICI that fluctuates randomly in terms of time. FIG. 1 illustrates a resource mapping example for PT-RSs and a DMRS in a physical resource block (PRB).

The mapping density of PT-RSs is assumed to be configured in the time domain where PT-RSs are mapped, for example, for every symbol, one of two neighboring symbols, or one of four neighboring symbols. Although studies have been conducted on configuring the mapping density of PT-RSs in the frequency domain, the mapping density of PT-RSs in the frequency domain is assumed to be low compared with the mapping density of DMRSs used in channel estimation. This is because since the effect of the phase noise is substantially the same in every subcarrier, a PT-RS mapped to any one of subcarriers can be shared by multiple PRBs.

According to the agreements on PT-RSs in 3GPP, PT-RSs are used between a base station (BS, eNB, or gNB) and a mobile station (terminal or UE) which is indicated by a base station using higher-layer signaling (such as radio resource control (RRC) signaling). Moreover, an assumption is made that the mapping density of PT-RSs in the time domain and in the frequency domain flexibly changes in accordance with a modulation order or a bandwidth and/or the like used between the base station and the mobile station.

Meanwhile, studies have been carried out on methods of determining the mapping density of PT-RSs by mobile stations. One of the methods is to indicate the mapping density of PT-RSs by a PT-RS dedicated control signal from a base station (explicit indication). Another method is to previously determine a correspondence between the mapping density of PT-RSs and another parameter (such as modulation order or bandwidth) and to determine the mapping density of PT-RSs with reference to the correspondence with the other parameter indicated by downlink control information (DCI) at the time of communication (implicit indication). Note that, there is a possibility that a method other than these methods is used.

Furthermore, application of the same precoding as that for DMRS ports to PT-RSs has been discussed, and PT-RS is possibly defined as DMRS. The DMRSs used as PT-RSs are more densely mapped in terms of time than other DMRSs. Moreover, reference signals used in correcting CPE/ICI caused by the phase noise may be called by a name different from "PT-RS."

Moreover, use of a Cyclic Prefix-Orthogonal Frequency Division Multiplexing (CP-OFDM) scheme in downlink (direction from a base station to a mobile station) is assumed in New Radio (NR). Meanwhile, studies have been carried out on both the CP-OFDM scheme and a Discrete Fourier Transform-Spread OFDM (DFT-S-OFDM) scheme in uplink (direction from a mobile station to a base station), and an assumption made that these schemes are used while being switched in accordance with communication environments, for example.

In each embodiment of the present disclosure, a description will be given of a method of appropriately determining an EVM of a transmission apparatus while taking into account the CPE/ICI correction relating to the phase noise of a transmission apparatus in a measurement apparatus that measures an EVM for output of the transmission apparatus and determines whether or not the EVM satisfies a requirement of a communication system.

Embodiment 1

[Summary of Communication System]

A communication system according to Embodiment 1 includes a transmission apparatus and a reception apparatus. More specifically, the transmission apparatus is a base station and the reception apparatus is a mobile station in downlink. Meanwhile, the transmission apparatus is a mobile station and the reception apparatus is a base station in uplink.

In the communication system according to Embodiment 1 includes a measurement apparatus that tests the performance of the transmission apparatus. The measurement apparatus, for example, measures an EVM of the transmission apparatus, and determines whether or not the EVM measurement value, which is the result of measurement, is equal to or less than a prescribed value (EVM requirement value), i.e., the measurement apparatus determines (evaluates) whether or not the EVM measurement value satisfies the prescribed requirement.

Hereinafter, a configuration of a communication system using the CP-OFDM scheme will be described in Operation Example 1 of Embodiment 1, and a configuration of a communication system using the DFT-S-OFDM scheme will be described in Operation Example 2 of Embodiment 1.

Operation Example 1

Figure 2:
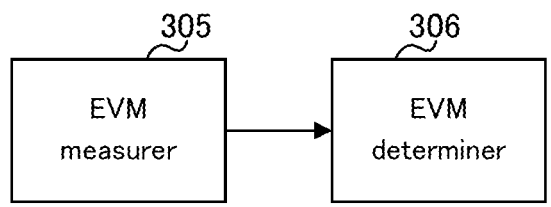
FIG. 2 is a block diagram illustrating a part of a configuration of a measurement apparatus according to Operation Example 1 of Embodiment 1.

FIG. 2 is a block diagram illustrating a part of a configuration of measurement apparatus 300 according to Operation Example 1. In measurement apparatus 300 illustrated in FIG. 2, EVM measurer 305 measures a modulation quality (EVM) of a signal transmitted from transmission apparatus 100. In a case where correction (CPE/ICI correction) relating to the phase noise of transmission apparatus 100 is necessary in reception apparatus 200, EVM determiner 306 determines whether or not the measurement value of the modulation quality is equal to or less than a first requirement value (EVM requirement value (b) to be described, hereinafter). The first requirement value herein is higher than a second requirement value (EVM requirement value (a) to be described, hereinafter) that is used in determining the measurement value in a case where the correction (CPE/ICI correction) relating to the phase noise of transmission apparatus 100 is unnecessary in reception apparatus 200.

[Configuration of Transmission Apparatus]

Figure 3:
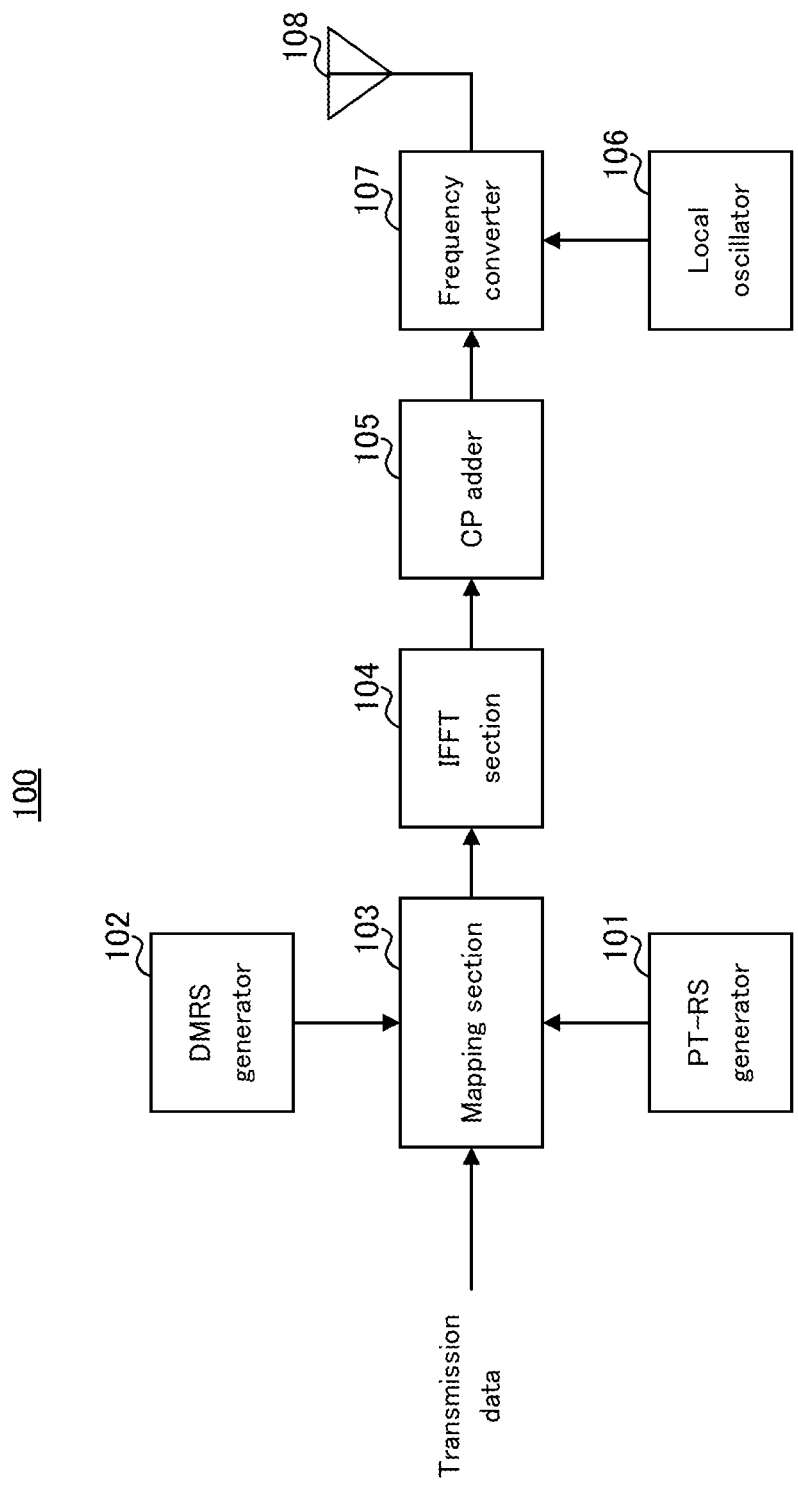
FIG. 3 is a block diagram illustrating a configuration of a transmission apparatus according to Operation Example 1 of Embodiment 1.

FIG. 3 is a block diagram illustrating a configuration of transmission apparatus 100 according to Operation Example 1 of Embodiment 1. In FIG. 3, transmission apparatus 100 includes PT-RS generator 101, DMRS generator 102, mapping section 103, inverse fast Fourier transform (IFFT) section 104, CP adder 105, local oscillator 106, frequency converter 107, and antenna 108.

PT-RS generator 101 generates a PT-RS in a case where CPE/ICI correction is considered necessary, and outputs the generated PT-RS to mapping section 103. In a case where, for example, the frequency band to which transmission data is assigned is high (e.g., frequency band not less than a prescribed threshold) or the modulation order for the transmission data is high (e.g., modulation order not less than a prescribed threshold), the effect of a phase noise of local oscillator 106 and/or the like is assumed to be large (i.e., CPE/ICI correction is considered necessary). Thus, PT-RS generator 101 may generate a PT-RS in this case.

DMRS generator 102 generates a DMRS and outputs the generated DMRS to mapping section 103.

Mapping section 103 maps, to a time and frequency domain resource (e.g., PRB), the transmission data to be input, the PT-RS input from PT-RS generator 101 (when CPE/ICI correction is considered necessary), and the DMRS input from DMRS generator 102, and outputs the mapped signal to IFFT section 104.

IFFT section 104 applies IFFT processing to the signal input from mapping section 103 and outputs the signal obtained by the IFFT processing to CP adder 105.

CP adder 105 adds a CP to the signal input from IFFT section 104 and outputs the signal to which the CP has been added (i.e., CP-OFDM signal) to frequency converter 107.

Local oscillator 106 generates a carrier signal for frequency conversion in frequency converter 107 and outputs the carrier signal to frequency converter 107.

Frequency converter 107 applies frequency conversion (up-conversion) to the signal input from CP adder 105, using the carrier signal input from local oscillator 106, and outputs the signal obtained by the frequency conversion to antenna 108.

Antenna 108 radiates the signal input from frequency converter 107.

[Configuration of Reception Apparatus]

Figure 4:
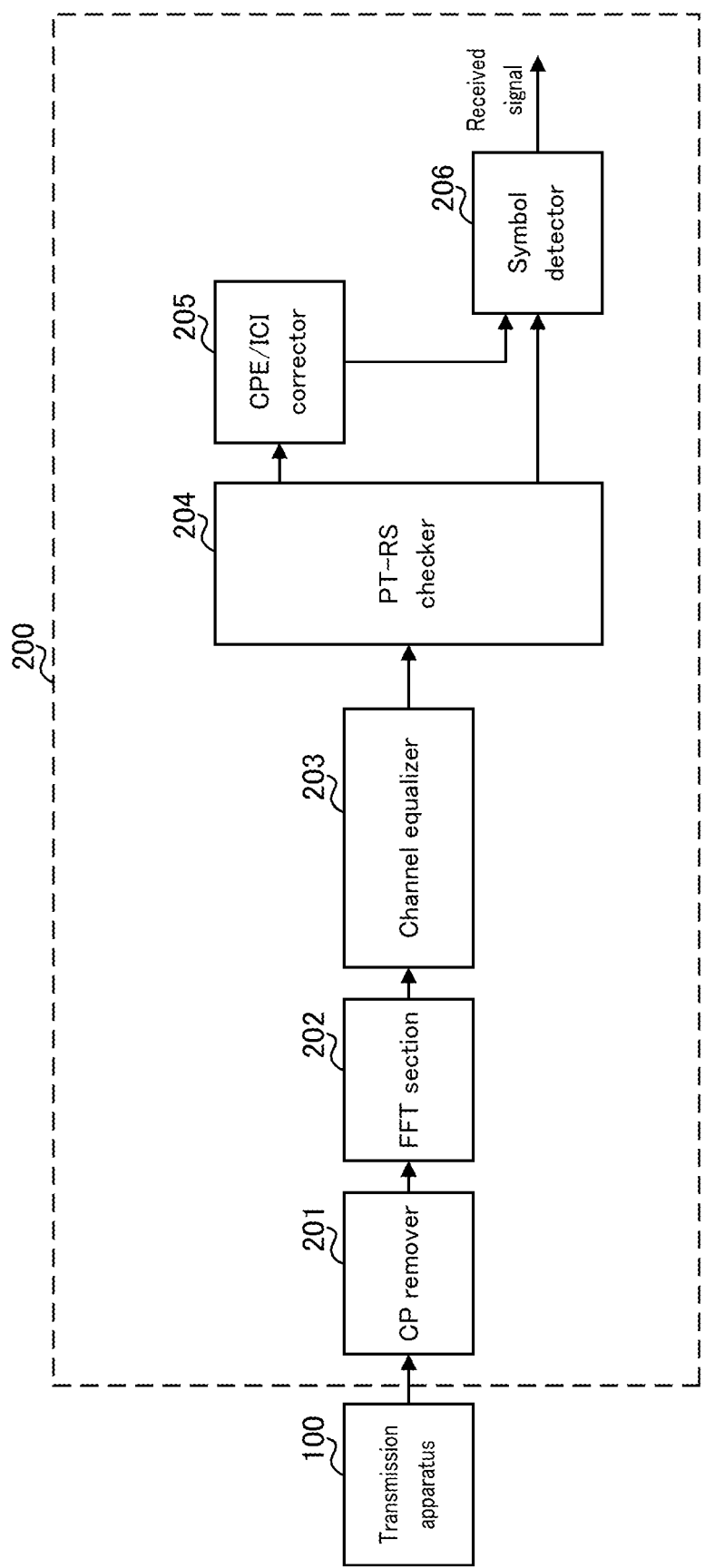
FIG. 4 is a block diagram illustrating a configuration of a reception apparatus according to Operation Example 1 of Embodiment 1.

FIG. 4 is a block diagram illustrating a configuration of reception apparatus 200 according to Operation Example 1 of Embodiment 1. In FIG. 4, reception apparatus 200 includes CP remover 201, fast Fourier transform (FFT) section 202, channel equalizer 203, PT-RS checker 204, CPE/ICI corrector 205, and symbol detector 206.

CP remover 201 removes a CP from the signal transmitted from transmission apparatus 100 and outputs the signal obtained by the CP removal to FFT section 202.

FFT section 202 applies FFT processing to the signal input from CP remover 201 and outputs the signal obtained by the FFT processing to channel equalizer 203.

Channel equalizer 203 applies channel equalization to the signal input from FFT section 202 and outputs the signal obtained by the channel equalization to PT-RS checker 204.

PT-RS checker 204 checks whether or not use of a PT-RS is indicated for the signal input from channel equalizer 203. In a case where use of a PT-RS is indicated, PT-RS checker 204 outputs the input signal to CPE/ICI corrector 205. Meanwhile, in a case where use of a PT-RS is not indicated, PT-RS checker 204 outputs the input signal to symbol detector 206. Note that, whether or not a PT-RS is used may be indicated explicitly or implicitly by a control signal and/or the like.

CPE/ICI corrector 205 estimates the CPE/ICI of the input signal, using a PT-RS contained in the signal input from PT-RS checker 204, and corrects (performs CPE/ICI correction on) the input signal based on the result of estimation. CPE/ICI corrector 205 outputs the corrected signal to symbol detector 206.

Symbol detector 206 detects a symbol from the signal received from PT-RS checker 204 or CPE/ICI corrector 205 and outputs the received signal.

[Configuration of Measurement Apparatus]

Figure 5:
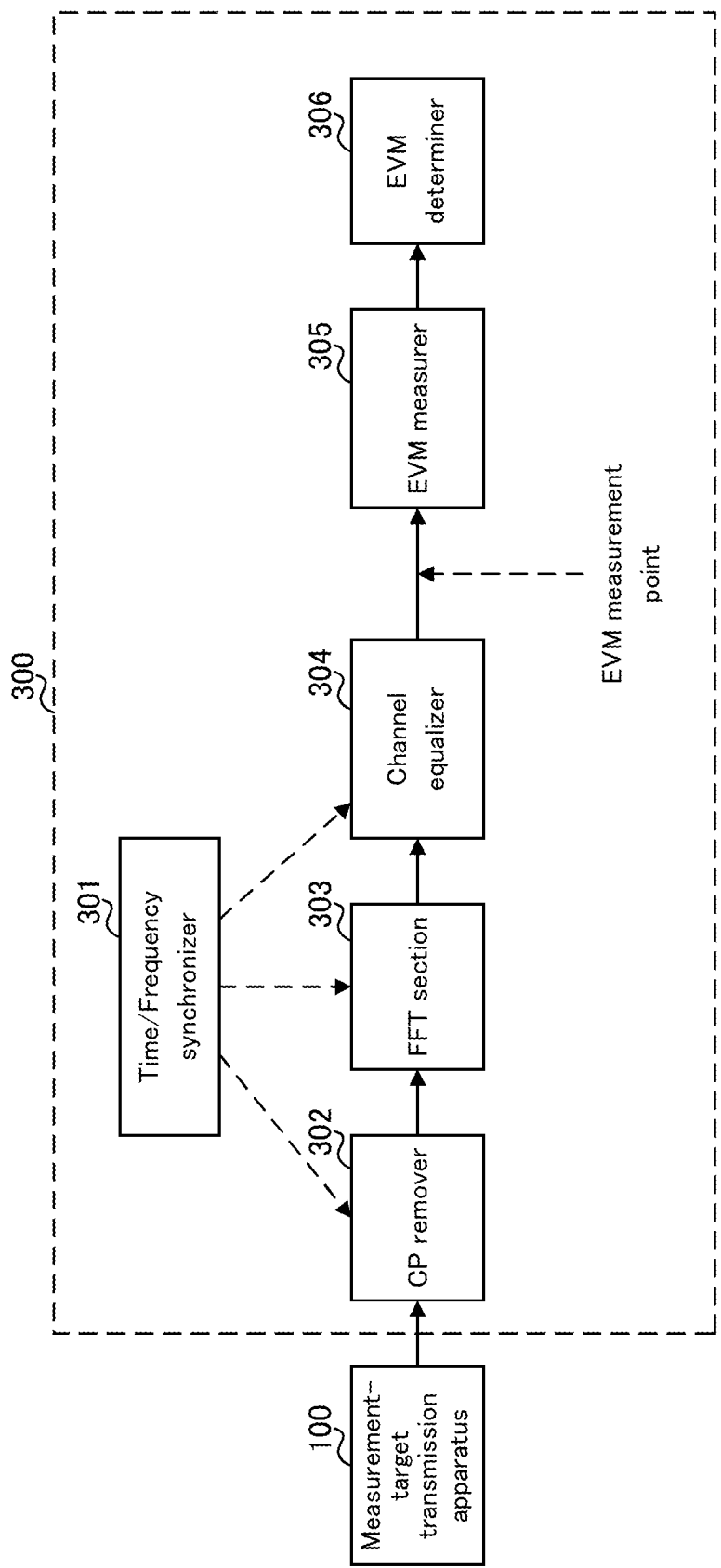
FIG. 5 is a block diagram illustrating the configuration of the measurement apparatus according to Operation Example 1 of Embodiment 1.

FIG. 5 is a block diagram illustrating a configuration of measurement apparatus 300 according to Operation Example 1 of Embodiment 1. Measurement apparatus 300 illustrated in FIG. 5 measures an EVM of a measurement-target transmission apparatus that transmits a CP-OFDM signal (e.g., transmission apparatus 100 illustrated in FIG. 3).

In FIG. 5, measurement apparatus 300 includes time/frequency synchronizer 301, CP remover 302, FFT section 303, channel equalizer 304, EVM measurer 305, and EVM determiner 306.

Note that, CP remover 302, FFT section 303, and channel equalizer 304 in measurement apparatus 300 have configurations similar to those of CP remover 201, FFT section 202, and channel equalizer 203, respectively, in reception apparatus 200 illustrated in FIG. 4. Measurement apparatus 300 assumes a point after the FFT processing and channel equalization (EVM measurement point) in reception apparatus 200 and measures an EVM.

Time/Frequency synchronizer 301 synchronizes the times and frequencies of CP remover 302, FFT section 303, and channel equalizer 304.

CP remover 302 removes a CP from the signal transmitted from measurement-target transmission apparatus 100 and outputs the signal obtained by the CP removal to FFT section 303.

FFT section 303 applies FFT processing to the signal input from CP remover 302 and outputs the signal obtained by the FFT processing to channel equalizer 304.

Channel equalizer 304 applies channel equalization to the signal input from FFT section 303 and outputs the signal obtained by the channel equalization to EVM measurer 305.

EVM measurer 305 detects a symbol from the signal input from channel equalizer 304 in a manner similar to that of symbol detector 206 of reception apparatus 200. EVM measurer 305 compares the detected symbol with a known ideal symbol and measures (calculates) an EVM based on a magnitude of an error between the detected symbol and the ideal symbol on a complex plane. EVM measurer 305 outputs the EVM measurement value to EVM determiner 306.

EVM determiner 306 determines whether or not the EVM measurement value input from EVM measurer 305 satisfies a prescribed requirement (whether or not the EVM measurement value is equal to or less than the EVM requirement value). More specifically, in a case where the EVM measurement value is equal to or less than the EVM requirement value, EVM determiner 306 determines that measurement-target transmission apparatus 100 is a transmission apparatus usable in the communication system. Meanwhile, in a case where the EVM measurement value exceeds the EVM requirement value, EVM determiner 306 determines that measurement-target transmission apparatus 100 is a transmission apparatus not usable (not satisfying the requirement) in the communication system.

[Operations of Measurement Apparatus 300]

Next, a detailed description will be given of operations of measurement apparatus 300.

As described above, in a case where a high frequency band or a high modulation order is used for transmission data to be transmitted from transmission apparatus 100 (FIG. 3) to reception apparatus 200 (FIG. 4) (i.e., when the effect of a phase noise of transmission apparatus 100 (local oscillator 106) and/or the like is large), transmission apparatus 100 maps a PT-RS, and reception apparatus 200 performs CPE/ICI correction, using the PT-RS.

Although CPE/ICI is actually corrected in reception apparatus 200, an EVM is measured for a signal on which no CPE/ICI correction is applied (signal after channel equalization) in measurement apparatus 300. Meanwhile, the current test standard (e.g., see NPLs 3 and 4) does not assume CPE/ICI correction in EVM requirement values used in evaluation at the time of EVM measurement.

Accordingly, when the current test standard is applied in measurement apparatus 300, CPE/ICI correction is applied in reception apparatus 200 to the signal transmitted from transmission apparatus 100, and the EVM is improved (reduced). In the test (EVM determination) of measurement apparatus 300, however, there is a possibility that transmission apparatus 100 is not allowed because the improvement of the EVM in reception apparatus 200 is not taken into account, and the EVM measurement value exceeds the EVM requirement value. More specifically, there is a possibility that the performance of transmission apparatus 100 is undervalued under the current test standard.

In this respect, in Embodiment 1, an EVM requirement value for an EVM measurement value of a case where the CPE/ICI correction relating to the phase noise of transmission apparatus 100 is necessary in reception apparatus 200 is configured in addition to an EVM requirement value for an EVM measurement value of a case where the CPE/ICI correction relating to the phase noise of transmission apparatus 100 is unnecessary in reception apparatus 200 (i.e., similar to the current test standard). More specifically, measurement apparatus 300 (EVM determiner 306) newly configures an EVM requirement value assuming that the CPE/ICI correction is performed in reception apparatus 200.

The lower the EVM requirement value is (i.e., the lower the required EVM value is), the higher the performance required in transmission apparatus 100 is. In this respect, in Embodiment 1, the EVM requirement value of the case where the CPE/ICI correction is necessary in reception apparatus 200 is configured to be higher than the EVM requirement value of the case where the CPE/ICI correction is unnecessary in reception apparatus 200 (i.e., the requirement is eased), while the improvement of the EVM in reception apparatus 200 is taken into account.

More specifically, when the CPE/ICI correction in reception apparatus 200 is taken into account, measurement apparatus 300 measures an EVM at a point before the CPE/ICI correction is performed, as in the current test standard (LTE/LTE-Advanced standard), but a value higher than the EVM requirement value of the current test standard (i.e., non-strict requirement value) is configured. More specifically, in a case where the CPE/ICI correction relating to the phase noise of transmission apparatus 100 is necessary in reception apparatus 200, measurement apparatus 300 determines whether or not the EVM measurement value is equal to or less than the EVM requirement value that is higher than the EVM requirement value used in determination of the EVM measurement value in a case where the CPE/ICI correction relating to the phase noise of transmission apparatus 100 is unnecessary in reception apparatus 200.

Note that, in Embodiment 1, the frequency band and the modulation order for the signal transmitted from transmission apparatus 100 are used as a transmission parameter relating to the increase or decrease in the effect of the phase noise of transmission apparatus 100. More specifically, in a case where a high frequency band or a high modulation order is used, a standard is newly configured, in which the EVM requirement value is eased (configured to be high) compared with a case where neither a high frequency band nor a high modulation order is used.

FIG. 6 illustrates examples of EVM requirement values of a case where CPE/ICI correction is unnecessary (e.g., case where neither high frequency band nor high modulation order is used) (a) (hereinafter, referred to as "EVM requirement values (a)") and EVM requirement values of a case where CPE/ICI correction is necessary (e.g., case where high frequency band and high modulation order are used) (b) (hereinafter, referred to as "EVM requirement values (b)").

An assumption is made herein that, when an EVM measurement value of transmission apparatus 100 using a high frequency band and a high modulation order satisfies the EVM requirement value (b), the error rate characteristics are obtained which are equivalent to those of a case where the EVM requirement value (a) is satisfied in transmission apparatus 100 that requires no CPE/ICI correction.

More specifically, in a case where QPSK (low modulation order) illustrated in FIG. 6 is used, the EVM requirement value (a) of the case where CPE/ICI correction is unnecessary and the EVM requirement value (b) of the case where CPE/ICI correction is necessary are the same. Meanwhile, in a case where 16QAM, 64QAM, and 256QAM (high modulation orders) illustrated in FIG. 6 are used, the EVM requirement values (b) of the case where CPE/ICI correction is necessary are configured to be eased values (high values) compared with the EVM requirement values (a) of the case where CPE/ICI correction is unnecessary. In FIG. 6, for example, the higher the modulation order is, the higher the degree of increase in the EVM requirement values (b) with respect to the EVM requirement values (a) is.

Note that, the configurations of the EVM requirement values illustrated in FIG. 6 are exemplary and are not limited to the values illustrated in FIG. 6. Moreover, although the correspondence between the modulation orders and EVM requirement values is illustrated in FIG. 6, a correspondence between frequency bands and EVM requirement values may be configured in a similar manner. In a case where a high frequency band is used, for example, for any modulation scheme (modulation order) to be used, the EVM requirement values (b) of the case where CPE/ICI correction is necessary may be configured to be eased values (high values) compared with the EVM requirement values (a) of the case where CPE/ICI correction is unnecessary (not illustrated).

Figure 7:
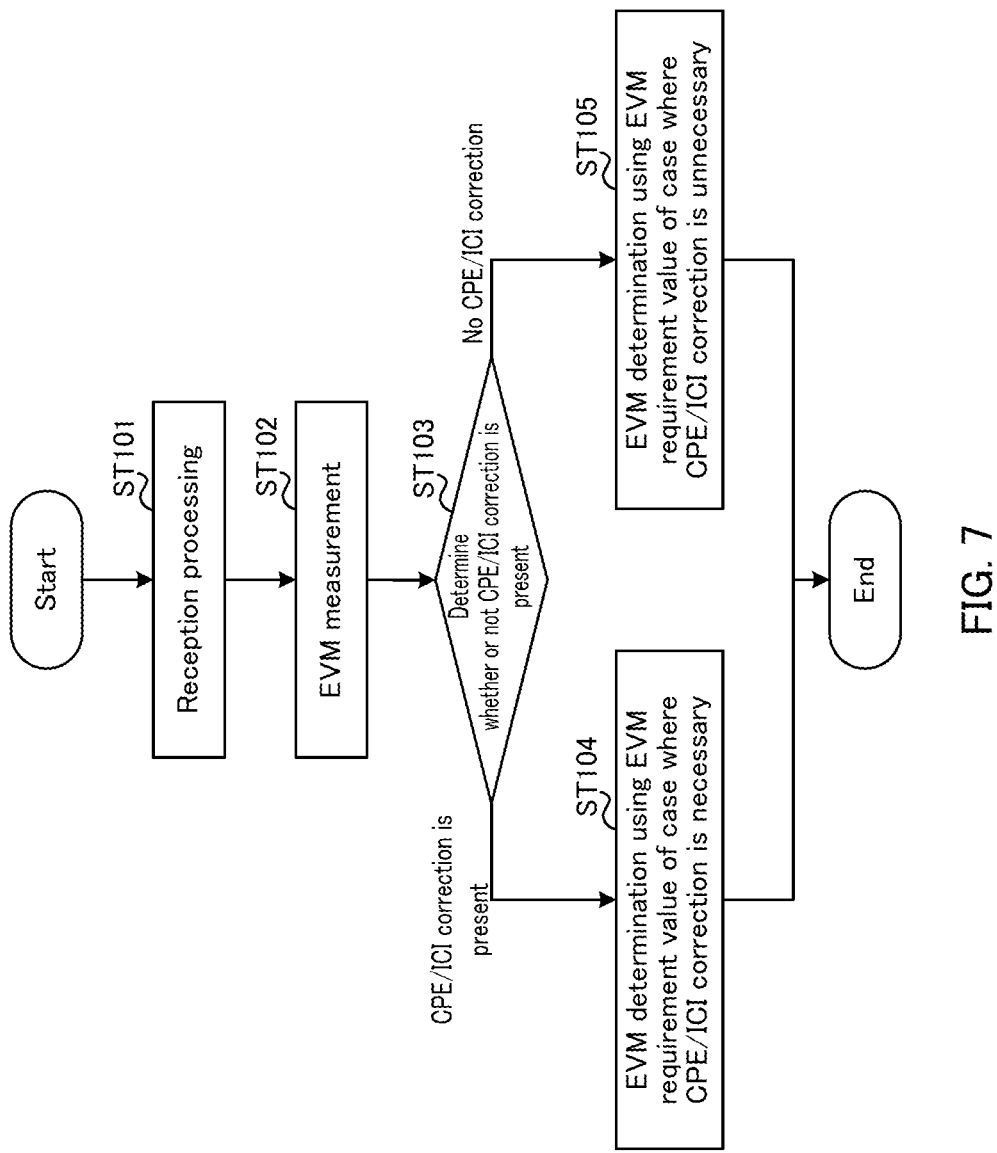
FIG. 7 is a flowchart illustrating processing of the measurement apparatus according to Operation Example 1 of Embodiment 1.

Next, FIG. 7 illustrates an example of a processing flow of measurement apparatus 300.

In FIG. 7, measurement apparatus 300 (CP remover 302, FFT section 303, and/or channel equalizer 304) applies reception processing similar to that of reception apparatus 200 to the signal (CP-OFDM signal) transmitted from measurement-target transmission apparatus 100 (ST 101).

Next, measurement apparatus 300 (EVM measurer 305) measures an EVM, using the received signal (ST 102).

Next, measurement apparatus 300 (EVM determiner 306) determines whether or not CPE/ICI correction in reception apparatus 200 for the signal transmitted from measurement-target transmission apparatus 100 is considered necessary (i.e., determines whether or not CPE/ICI correction is present) (ST 103). EVM determiner 306, for example, may determine whether or not CPE/ICI correction is present in reception apparatus 200 based on a frequency band or a modulation order used for the signal transmitted from measurement-target transmission apparatus 100. Note that, information on the the frequency band or the modulation order used in transmission apparatus 100 may be indicated explicitly or implicitly using a control signal and/or the like or may be prescribed at the time of EVM measurement.

In a case where a high frequency band or a high modulation order is used, i.e., CPE/ICI correction in reception apparatus 200 is considered necessary (ST 103: CPE/ICI correction is present), for example, measurement apparatus 300 (EVM determiner 306) performs EVM determination, using the EVM requirement value (b) of the case where CPE/ICI correction is necessary illustrated in FIG. 6 (e.g., EVM requirement value that is eased compared with the current test standard) (ST 104).

Meanwhile, in a case where a high frequency band or a high modulation order is not used, i.e., CPE/ICI correction in reception apparatus 200 is considered unnecessary (ST 103: No CPE/ICI correction), for example, measurement apparatus 300 (EVM determiner 306) performs EVM determination, using the EVM requirement value (a) of the case where CPE/ICI correction is unnecessary illustrated in FIG. 6 (e.g., EVM requirement value that similar to the current test standard) (ST 105).

As described above, measurement apparatus 300 determines whether or not CPE/ICI correction is present in reception apparatus 200 based on the frequency band or the modulation order used for the signal transmitted from transmission apparatus 100 and switches between the EVM requirement values to be used for EVM determination based on the result of determination.

Accordingly, measurement apparatus 300 can appropriately evaluate the EVM measurement value based on the frequency band or the modulation order used for the signal transmitted from transmission apparatus 100 (i.e., whether or not CPE/ICI correction in reception apparatus 200 is necessary). More specifically, measurement apparatus 300 can perform EVM determination (EVM evaluation), taking into account the CPE/ICI correction (i.e., improvement of EVM) in reception apparatus 200 for transmission apparatus 100 using a high frequency band or a high modulation order. More specifically, measurement apparatus 300 can allow for communication for transmission apparatus 100 having the phase noise not allowed under the current test standard, using a test standard that takes into account the improvement of an EVM by the CPE/ICI correction in reception apparatus 200.

As described above, measurement-target transmission apparatus 100 using a high frequency band or a high modulation order can perform communication using the modulation scheme with reception apparatus 200 provided with a CPE/ICI correction feature, in a case where a requirement by the EVM requirement value (b) of the case where CPE/ICI correction is necessary illustrated in FIG. 6 is satisfied in EVM determination by measurement apparatus 300.

Moreover, measurement-target transmission apparatus 100 can use local oscillator 106 which produces a phase noise that may not be allowed under the current test standard, in the case where a high frequency band and a high modulation order are used. Stated differently, transmission apparatus 100 does not have to include a high performance local oscillator for suppressing production of the phase noise to an extent allowable under the current test standard even in the case where a high frequency band and a high modulation order are used. Thus, an increase in configuration or costs of local oscillator 106 provided to transmission apparatus 100 can be prevented.

Operation Example 2

[Configuration of Transmission Apparatus]

Figure 8:
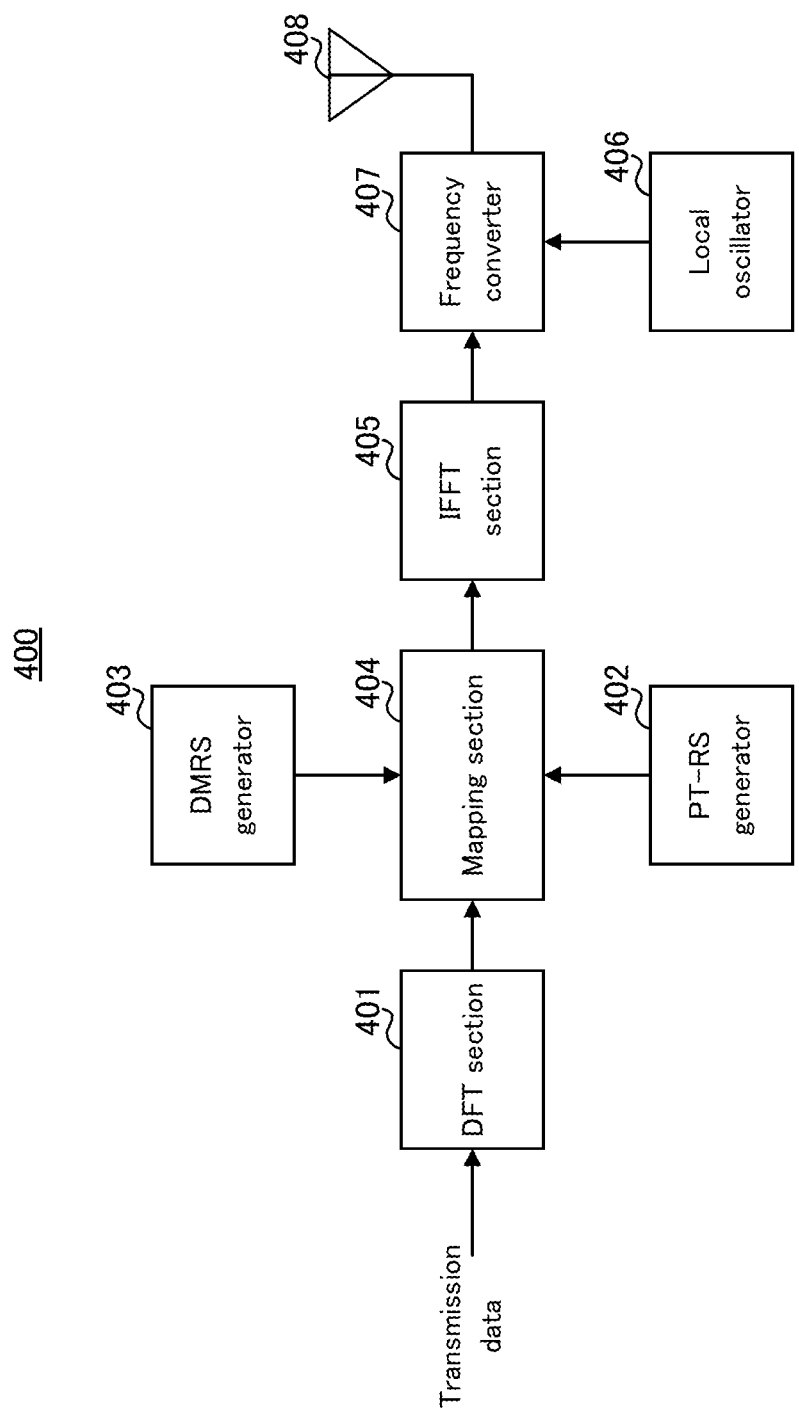
FIG. 8 is a block diagram illustrating a configuration of a transmission apparatus according to Operation Example 2 of Embodiment 1.

FIG. 8 is a block diagram illustrating a configuration of transmission apparatus 400 according to Operation Example 2 of Embodiment 1. In FIG. 8, transmission apparatus 100 includes a discrete Fourier transform (DFT) section 401, PT-RS generator 402, DMRS generator 403, mapping section 404, IFFT section 405, local oscillator 406, frequency converter 407, and antenna 408.

DFT section 401 applies DFT processing to the transmission data to be input and outputs the transmission data obtained by the DFT processing to mapping section 404.

PT-RS generator 402 has a configuration similar to PT-RS generator 101 (FIG. 3), generates a PT-RS in a case where CPE/ICI correction is considered necessary, and outputs the generated PT-RS to mapping section 404.

DMRS generator 403 has a configuration similar to DMRS generator 102 (FIG. 3), generates a DMRS, and outputs the generated DMRS to mapping section 404.

Mapping section 404 maps the transmission data input from DFT section 401, the PT-RS input from PT-RS generator 402 (when CPE/ICI correction is necessary), and the DMRS input from DMRS generator 403 to a time and frequency domain resource (e.g., PRB) and outputs the signal obtained by the mapping to IFFT section 405.

IFFT section 405 applies IFFT processing to the signal input from mapping section 404 and outputs the signal obtained by the IFFT processing (i.e., DFT-S-OFDM signal) to frequency converter 407.

Local oscillator 406 generates a carrier signal for frequency conversion in frequency converter 407 and outputs the carrier signal to frequency converter 407.

Frequency converter 407 applies frequency conversion (up-conversion) to the signal input from IFFT section 405, using the carrier signal input from local oscillator 406, and outputs the signal obtained by the frequency conversion to antenna 408.

Antenna 408 radiates the signal input from frequency converter 407.

[Configuration of Reception Apparatus]

Figure 9:
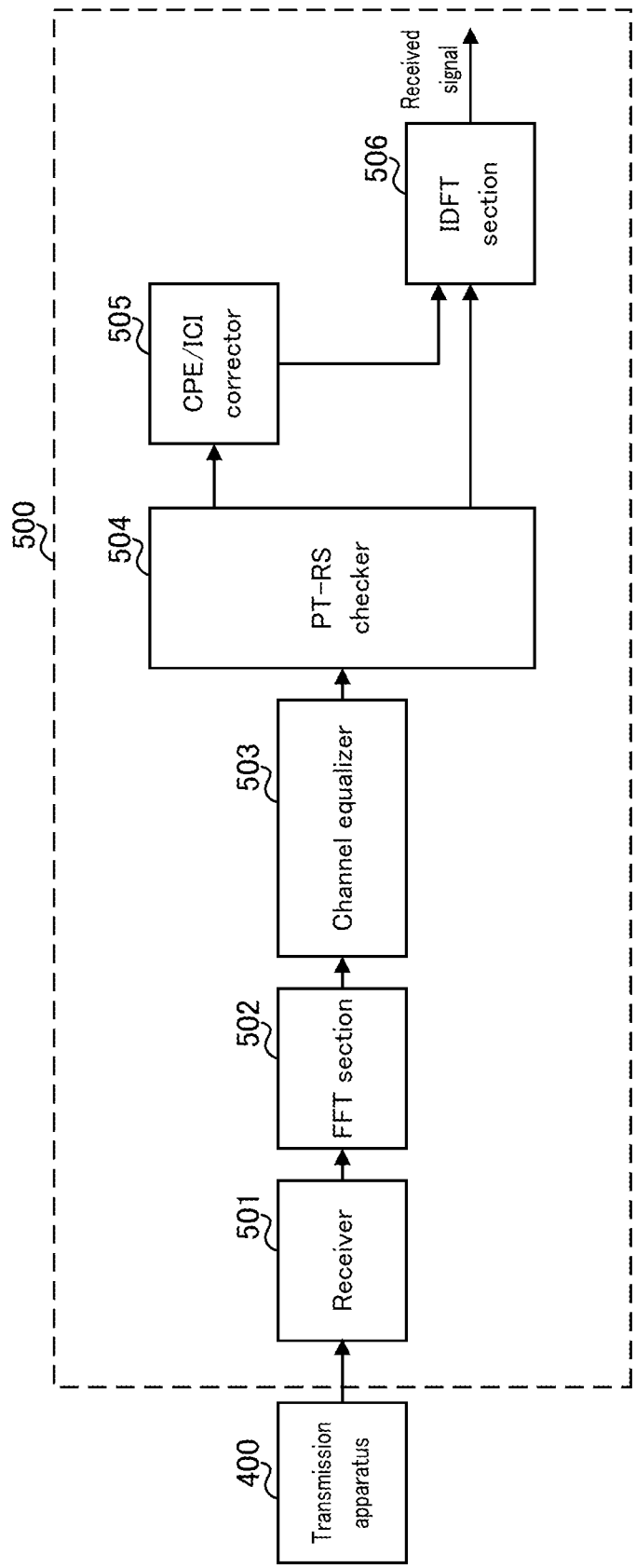
FIG. 9 is a block diagram illustrating a configuration of a reception apparatus according to Operation Example 2 of Embodiment 1.

FIG. 9 is a block diagram illustrating a configuration of reception apparatus 500 according to Operation Example 2 of Embodiment 1. In FIG. 9, reception apparatus 500 includes receiver 501, FFT section 502, channel equalizer 503, PT-RS checker 504, CPE/ICI corrector 505, and inverse discrete Fourier transform (IDFT) section 506.

Receiver 501 receives a signal (radio frequency (RF) signal) transmitted from transmission apparatus 400 and applies reception processing such as down-conversion to the received signal. Receiver 501 outputs the signal obtained by the reception processing to FFT section 502.

FFT section 502 applies FFT processing to the signal input from receiver 501 and outputs the signal obtained by the FFT processing to channel equalizer 503.

Channel equalizer 503 applies channel equalization to the signal input from FFT section 502 and outputs the signal obtained by the channel equalization to PT-RS checker 504.

PT-RS checker 504 checks whether or not use of a PT-RS is indicated for the signal input from channel equalizer 503 as in PT-RS checker 204 (FIG. 4). In a case where use of a PT-RS is indicated, PT-RS checker 504 outputs the input signal to CPE/ICI corrector 505. Meanwhile, in a case where use of a PT-RS is not indicated, PT-RS checker 504 outputs the input signal to IDFT section 506. Note that, whether or not a PT-RS is used may be indicated explicitly or implicitly by a control signal and/or the like.

CPE/ICI corrector 505 estimates the CPE/ICI of the input signal, using a PT-RS contained in the signal input from PT-RS checker 504, and corrects (performs CPE/ICI correction on) the input signal based on the result of estimation. CPE/ICI corrector 505 outputs the signal obtained by the correction to IDFT section 506.

IDFT section 506 applies IDFT processing to the signal input from PT-RS checker 504 or CPE/ICI corrector 505 and outputs the signal obtained by the IDFT processing (received signal).

[Configuration of Measurement Apparatus]

Figure 10:
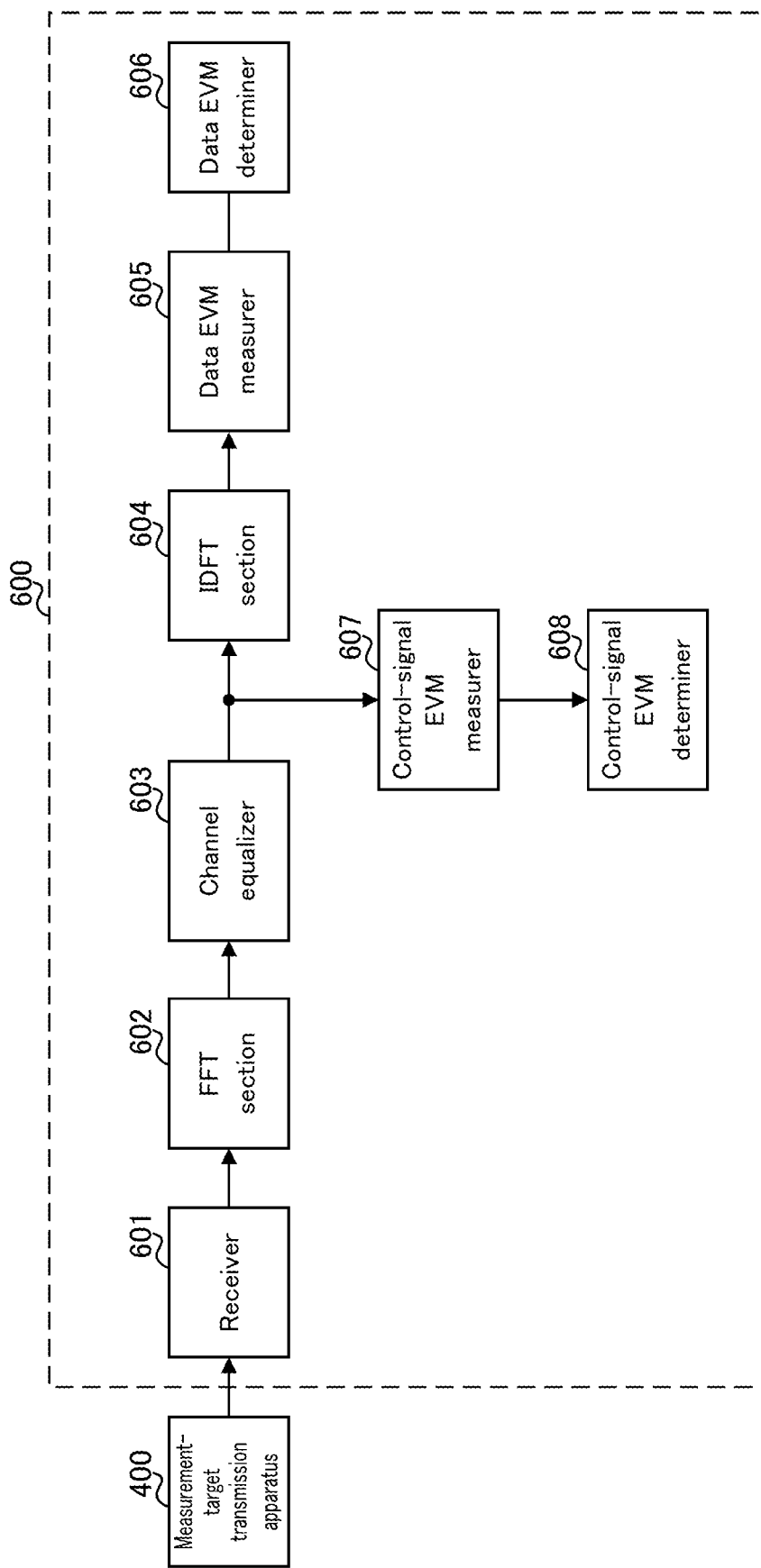
FIG. 10 is a block diagram illustrating a configuration of a measurement apparatus according to Operation Example 2 of Embodiment 1.

FIG. 10 is a block diagram illustrating a configuration of measurement apparatus 600 according to Operation Example 2 of Embodiment 1. Measurement apparatus 600 illustrated in FIG. 10 measures an EVM of a measurement-target transmission apparatus that transmits a DFT-S-OFDM signal (e.g., transmission apparatus 400 illustrated in FIG. 8).

In FIG. 10, measurement apparatus 600 includes receiver 601, FFT section 602, channel equalizer 603, IDFT section 604, data EVM measurer 605, data EVM determiner 606, control-signal EVM measurer 607, and control-signal EVM determiner 608.

Note that, receiver 601, FFT section 602, channel equalizer 603, and IDFT section 604 in measurement apparatus 600 have configurations similar to receiver 501, FFT section 502, channel equalizer 503, and IDFT section 506, respectively, in reception apparatus 500 illustrated in FIG. 9. Measurement apparatus 600 assumes a point after the FFT processing and channel equalization in reception apparatus 500 (EVM measurement point) and measures an EVM for a control signal (e.g., Physical Uplink Control Channel (PUCCH) and/or the like) and/or a reference signal (such as DMRS), and assumes a point after the IDFT processing in reception apparatus 500 (EVM measurement point) and measures an EVM for data (e.g., Physical Uplink Shared Channel (PUSCH)).

Receiver 601 receives a signal (RF signal) transmitted from a measurement-target transmission apparatus (transmission apparatus 400) and applies reception processing such as down-conversion to the received signal. Receiver 601 outputs the signal obtained by the reception processing to FFT section 602.

FFT section 602 applies FFT processing to the signal input from receiver 601 and outputs the signal obtained by the FFT processing to channel equalizer 603.

Channel equalizer 603 applies channel equalization to the signal input from FFT section 602 and outputs the signal obtained by the channel equalization to IDFT section 604 and control-signal EVM measurer 607.

IDFT section 604 applies IDFT processing to the signal input from channel equalizer 603 and outputs the signal obtained by the IDFT processing to data EVM measurer 605.

Data EVM measurer 605 detects a data symbol from the signal input from IDFT section 604. Data EVM measurer 605 compares the detected data symbol with a known ideal symbol and measures (calculates) an EVM of data from a magnitude of an error between the detected data symbol and the ideal symbol on a complex plane. Data EVM measurer 605 outputs an EVM measurement value to data EVM determiner 606.

Data EVM determiner 606 determines whether or not the EVM measurement value input from data EVM measurer 605 satisfies a prescribed requirement (whether or not the EVM measurement value is equal to or less than the EVM requirement value).

Control-signal EVM measurer 607 detects a symbol of a control signal (control symbol) and/or a symbol of a reference signal (reference signal symbol) from the signal input from channel equalizer 603. Control-signal EVM measurer 607 compares the detected control symbol and/or the reference signal symbol with a known ideal symbol and measures (calculates) an EVM of the control signal and/or the reference signal from a magnitude of an error between the control symbol and/or the reference signal symbol, and the ideal symbol on a complex plane. Control-signal EVM measurer 607 outputs the EVM measurement value to control-signal EVM determiner 608.

Control-signal EVM determiner 608 determines whether or not the EVM measurement value input from control-signal EVM measurer 607 satisfies a prescribed requirement (whether or not the EVM measurement value is equal to or less than the EVM requirement value).

[Operations of Measurement Apparatus 600]

Next, a detailed description will be given of operations of measurement apparatus 600.

In Operation Example 2, as in Operation Example 1, an EVM requirement value for an EVM measurement value of a case where the CPE/ICI correction relating to the phase noise of transmission apparatus 400 is necessary in reception apparatus 500 is configured, in addition to an EVM requirement value for an EVM measurement value of a case where the CPE/ICI correction relating to the phase noise of transmission apparatus 400 is unnecessary in reception apparatus 500 (i.e., similar to the current test standard). More specifically, measurement apparatus 600 newly configures an EVM requirement value assuming that the CPE/ICI correction is performed in reception apparatus 500.

Note that, in Embodiment 1, as described above, the frequency band and the modulation order for the signal transmitted from transmission apparatus 400 are used as a transmission parameter relating to the increase or decrease in the effect of the phase noise of transmission apparatus 400. More specifically, in a case where a high frequency band or a high modulation order is used, a standard is newly configured, in which the EVM requirement value is eased (configured to be high) compared with a case where neither a high frequency band nor a high modulation order is used. Note that, information on the frequency band or the modulation order used in transmission apparatus 400 may be indicated explicitly or implicitly using a control signal and/or the like or may be prescribed at the time of EVM measurement.

FIG. 11 illustrates examples of EVM requirement values of a case where CPE/ICI correction is unnecessary (e.g., case where neither high frequency band nor high modulation order is used) (a) and EVM requirement values of a case where CPE/ICI correction is necessary (e.g., case where high frequency band and high modulation order are used) (b).

An assumption is made herein that, when an EVM measurement value of transmission apparatus 400 using a high frequency band and a high modulation order satisfies the EVM requirement value (b), the error rate characteristics are obtained which are equivalent to those of a case where the EVM requirement value (a) is satisfied in transmission apparatus 400 that requires no CPE/ICI correction.

More specifically, in a case where BPSK or QPSK (low modulation order) illustrated in FIG. 11 is used, the EVM requirement value (a) of the case where CPE/ICI correction is unnecessary and the EVM requirement value (b) of the case where CPE/ICI correction is necessary are the same. Meanwhile, in a case where 16QAM and 64QAM (high modulation orders) illustrated in FIG. 11 are used, the EVM requirement values (b) of the case where CPE/ICI correction is necessary are configured to be eased values (high values) compared with the EVM requirement values (a) of the case where CPE/ICI correction is unnecessary. In FIG. 11, for example, the higher the modulation order is, the higher the degree of increase in the EVM requirement values (b) with respect to the EVM requirement values (a) is.

Note that, the configurations of the EVM requirement values illustrated in FIG. 11 are exemplary and are not limited to the values illustrated in FIG. 11. Moreover, although the correspondence between the modulation orders and EVM requirement values is illustrated in FIG. 11, a correspondence between frequency bands and EVM requirement values may be configured in a similar manner. In a case where a high frequency band is used, for example, for any modulation scheme (modulation order) to be used, the EVM requirement values (b) of the case where CPE/ICI correction is necessary may be configured to be eased values (high values) compared with the EVM requirement values (a) of the case where CPE/ICI correction is unnecessary (not illustrated).

Measurement apparatus 600 (data EVM determiner 606 and control-signal EVM determiner 608) performs EVM determination using the EVM requirement value (b) of the case where the CPE/ICI correction is necessary illustrated in FIG. 11 (e.g., an EVM requirement value that is eased compared with the current test standard), for example, in a case where a high frequency band or a high modulation order is used, i.e., the CPE/ICI correction in reception apparatus 500 is considered necessary. Meanwhile, for example, in a case where a high frequency band or a high modulation order is not used, i.e., the CPE/ICI correction in reception apparatus 500 is considered unnecessary, measurement apparatus 600 performs EVM determination, using the EVM requirement value (a) of the case where the CPE/ICI correction is unnecessary illustrated in FIG. 11 (e.g., EVM requirement value similar to the current test standard).

As described above, measurement apparatus 600 determines whether or not CPE/ICI correction is present in reception apparatus 500 based on the frequency band or the modulation order used for the signal transmitted from transmission apparatus 400 and switches between the EVM requirement values to be used for EVM determination based on the result of determination.

Accordingly, measurement apparatus 600 can appropriately evaluate the EVM measurement value based on the frequency band or the modulation order used for the signal transmitted from transmission apparatus 400 (i.e., whether or not CPE/ICI correction in reception apparatus 500 is necessary) as in Operation Example 1. More specifically, measurement apparatus 600 can perform EVM determination, taking into account the CPE/ICI correction (i.e., improvement of EVM) in reception apparatus 500 for transmission apparatus 400 using a high frequency band or a high modulation order. More specifically, measurement apparatus 600 can allow for communication for transmission apparatus 400 having the phase noise not allowed under the current test standard, using a test standard that takes into account the improvement of an EVM by the CPE/ICI correction in reception apparatus 500.

As described above, measurement-target transmission apparatus 400 using a high frequency band and a high modulation order can perform communication using the modulation scheme with reception apparatus 500 provided with a CPE/ICI correction feature, in a case where a requirement by the EVM requirement value (b) of the case where CPE/ICI correction is necessary illustrated in FIG. 11 is satisfied in EVM determination by measurement apparatus 600.

Moreover, measurement-target transmission apparatus 400 can use local oscillator 406 which produces a phase noise that may not be allowed under the current test standard, in a case where a high frequency band and a high modulation order are used. Stated differently, transmission apparatus 400 does not have to include a high performance local oscillator for suppressing production of the phase noise to an extent allowable under the current test standard even in a case where a high frequency band and a high modulation order are used. Thus, an increase in configuration or costs of local oscillator 406 provided to transmission apparatus 400 can be prevented.

Operation Examples 1 and 2 of Embodiment 1 have been described thus far.

As described above, in Embodiment 1, as with the current test standard in measurement apparatuses 300 and 600, an EVM having no effect of CPE/ICE correction (EVM before CPE/ICI correction) is measured while an EVM requirement value taking into account the CPE/ICI correction in reception apparatuses 200 and 500 (i.e., new test standard) is configured. In a case where CPE/ICI correction is determined to be necessary for a signal transmitted from transmission apparatuses 100 and 400, measurement apparatuses 300 and 600 perform EVM determination for transmission apparatuses 100 and 400 based on the new test standard, respectively.

Thus, according to Embodiment 1, measurement apparatuses 300 and 600 can each appropriately determine an EVM measurement value, taking into account the CPE/ICI correction.

Moreover, according to Embodiment 1, switching between the EVM requirement values in measurement apparatuses 300 and 600 according to whether or not the CPE/ICI correction in reception apparatuses 200 and 500 is necessary allows transmission apparatuses 100 and 400 (base station or mobile station) to include a local oscillator producing a phase noise that may not be allowed under the current test standard. More specifically, transmission apparatuses 100 and 400 (base station or mobile station) do not have to include a high performance local oscillator to be allowed under the current test standard.

Furthermore, measurement apparatuses 300 and 600 determine whether or not the CPE/ICI correction is necessary, i.e., whether or not the new test standard is applied in EVM determination based on a frequency band or a modulation order used for a signal transmitted from transmission apparatuses 100 and 400. Thus, measurement apparatuses 300 and 600 can each appropriately perform EVM determination in both cases where the CPE/ICI correction is necessary and where the CPE/ICI correction is unnecessary.

Embodiment 2

In Embodiment 2, as in Embodiment 1, an EVM requirement value for an EVM measurement value of a case where the CPE/ICI correction relating to the phase noise of a transmission apparatus is necessary in a reception apparatus is configured, in addition to an EVM requirement value for an EVM measurement value of a case where the CPE/ICI correction relating to the phase noise of the transmission apparatus is unnecessary in the reception apparatus (i.e., similar to the current test standard) in EVM determination.

Hereinafter, a description will be given of a configuration of a communication system using a CP-OFDM scheme in Operation Example 1 and a configuration of a communication system using a DFT-S-OFDM scheme in Operation Example 2, in a manner similar to Embodiment 1.

Operation Example 1

Note that, a transmission apparatus and a reception apparatus according to Embodiment 2 include basic configurations common to transmission apparatus 100 and reception apparatus 200 according to Embodiment 1, so that a description will be given while FIGS. 3 and 4 are incorporated herein.

[Configuration of Measurement Apparatus]

Figure 12:
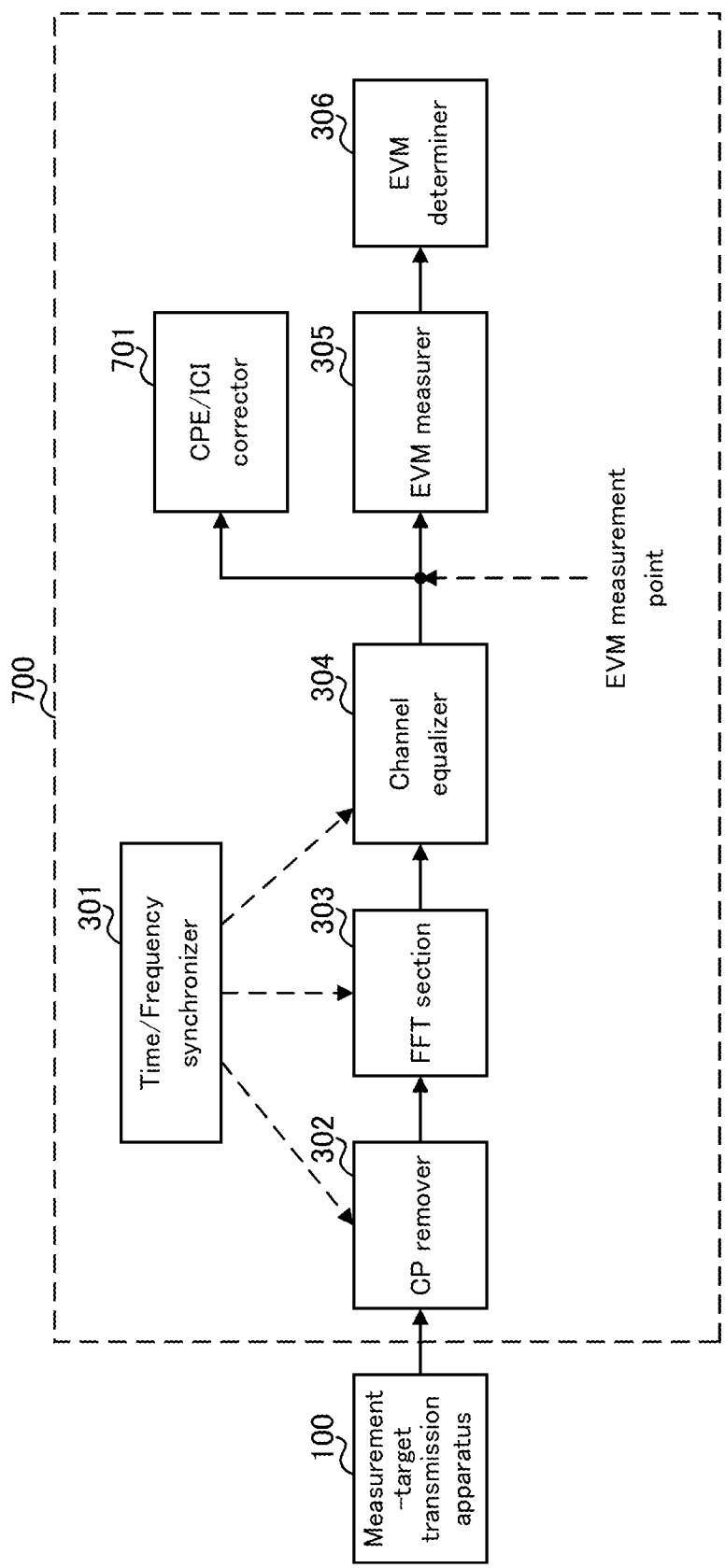
FIG. 12 is a block diagram illustrating a configuration of a measurement apparatus according to Operation Example 1 of Embodiment 2.

FIG. 12 is a block diagram illustrating a configuration of measurement apparatus 700 according to Operation Example 1 of Embodiment 2. Measurement apparatus 700 illustrated in FIG. 12 measures an EVM of a measurement-target transmission apparatus that transmits a CP-OFDM signal (e.g., transmission apparatus 100 illustrated in FIG. 3).

Note that, in FIG. 12, components that are similar to the components in Embodiment 1 (FIG. 5) are assigned the same reference numerals and their descriptions are omitted. More specifically, measurement apparatus 700 illustrated in FIG. 12 further includes CPE/ICI corrector 701 in addition to the components that are similar to the components of measurement apparatus 300 illustrated in FIG. 5.

CPE/ICI corrector 701 estimates the CPE/ICI of an input signal, using a PT-RS contained in the signal input from channel equalizer 304, and corrects (performs CPE correction/ICI correction on) the input signal based on the result of estimation as in reception apparatus 200 (CPE/ICI corrector 205).

Note that, as in Embodiment 1, EVM measurer 305 measures an EVM, using the signal input from channel equalizer 304. More specifically, in Embodiment 2, EVM measurer 305 assumes a point after FFT processing and channel equalization but before CPE/ICI correction in reception apparatus 200 (EVM measurement point) and measures an EVM.

EVM determiner 306 determines whether or not CPE/ICI correction is present in reception apparatus 200 and switches between the EVM requirement values (e.g., see FIG. 6) to be used in EVM determination, based on the result of determination.

EVM determiner 306, for example, may check whether or not use of a PT-RS is indicated (i.e., whether or not a PT-RS is contained in a signal from transmission apparatus 100) and switch between the EVM requirement values to be used in EVM determination, in accordance with the result of checking as in reception apparatus 200 (PT-RS checker 204). Alternatively, EVM determiner 306 may switch between the EVM requirement values to be used in EVM determination, in accordance with a transmission parameter (such as frequency band or modulation order) used for a signal transmitted from transmission apparatus 100 as in Embodiment 1. Note that, information indicating whether or not a PT-RS is used or information on the frequency band or the modulation order to be used for the signal may be indicated explicitly or implicitly using a control signal and/or the like.

Alternatively, in Embodiment 2, measurement apparatus 700 (measurement apparatus having a CPE/ICI correction feature) may perform EVM determination for transmission apparatus 100 that requires CPE/ICI correction, and measurement apparatus 300 (measurement apparatus having no CPE/ICI correction feature) described in Embodiment 1 may perform EVM determination for transmission apparatus 100 that requires no CPE/ICI correction.

As described above, measurement apparatus 700 switches between EVM requirement values to be used in EVM determination, in accordance with necessity of CPE/ICI correction (whether or not CPE/ICI correction is present).

Accordingly, measurement apparatus 700 can appropriately evaluate an EVM measurement value according to whether or not CPE/ICI correction is considered necessary. More specifically, measurement apparatus 700 can perform EVM determination, taking into account the CPE/ICI correction (i.e., improvement of EVM) in reception apparatus 200 for transmission apparatus 100 for which CPE/ICI correction is considered necessary. More specifically, measurement apparatus 700 can allow for communication for transmission apparatus 100 having the phase noise not allowed under the current test standard, using a test standard that takes into account the improvement of an EVM by the CPE/ICI correction in reception apparatus 200.

As described above, measurement-target transmission apparatus 100 for which the CPE/ICI correction is considered necessary can perform communication using the modulation scheme with reception apparatus 200 provided with a CPE/ICI correction feature, in a case where a requirement by the EVM requirement value (b) of the case where CPE/ICI correction is necessary illustrated in FIG. 6 is satisfied in EVM determination by measurement apparatus 700.

Moreover, measurement-target transmission apparatus 100 can use local oscillator 106 which produces a phase noise that may not be allowed under the current test standard in the case where the CPE/ICI correction is considered necessary. Stated differently, transmission apparatus 100 does not have to include a high performance local oscillator for suppressing production of the phase noise to an extent allowable under the current test standard even in the case where the CPE/ICI correction is considered necessary. Thus, an increase in configuration or costs of local oscillator 106 provided to transmission apparatus 100 can be prevented.

Operation Example 2

Note that, a transmission apparatus and a reception apparatus according to Embodiment 2 include basic configurations common to transmission apparatus 400 and reception apparatus 500 according to Embodiment 1, so that a description will be given while FIGS. 8 and 9 are incorporated herein.

[Configuration of Measurement Apparatus]

Figure 13:
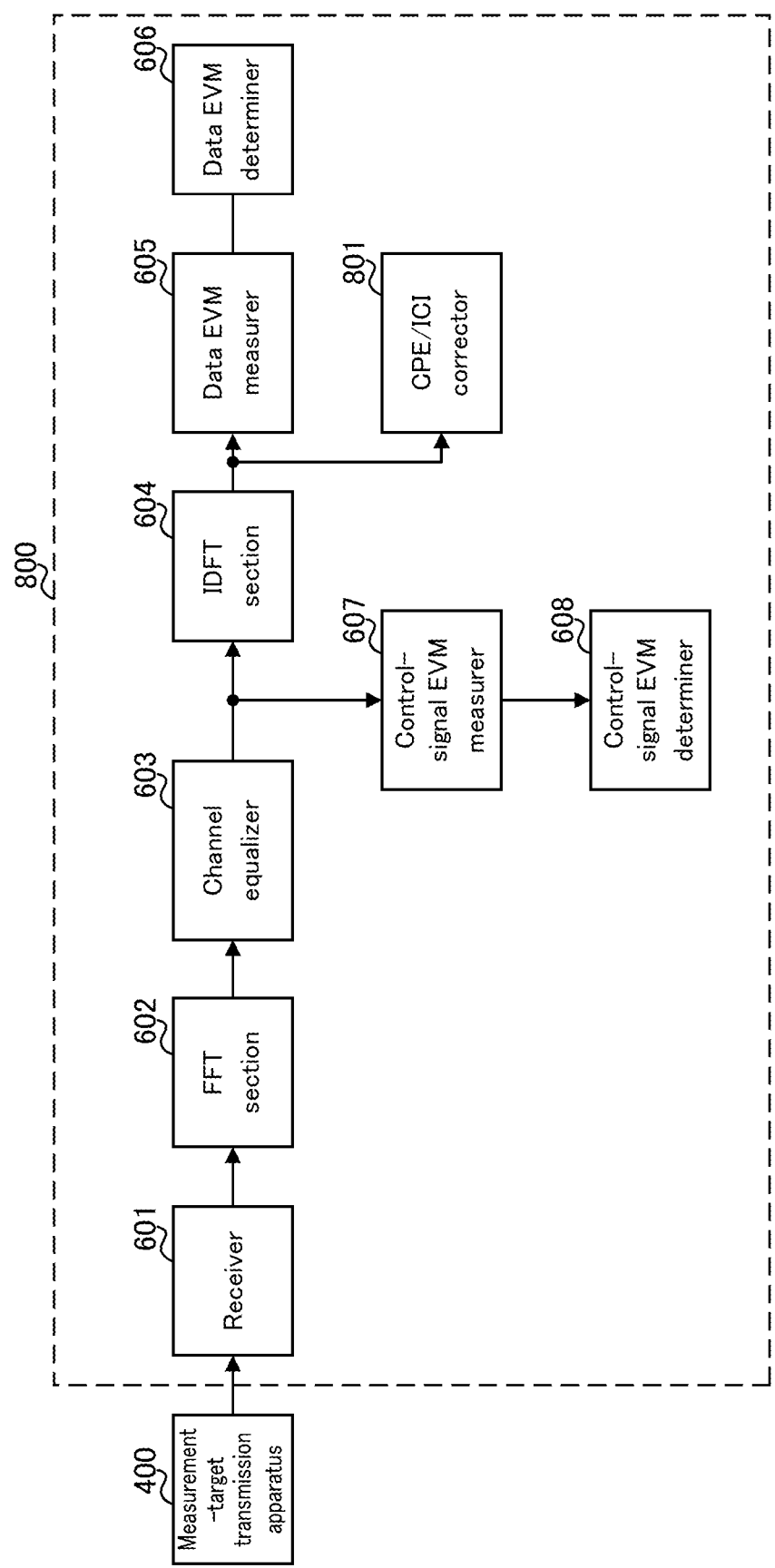
FIG. 13 is a block diagram illustrating a configuration of a measurement apparatus according to Operation Example 2 of Embodiment 2.

FIG. 13 is a block diagram illustrating a configuration of measurement apparatus 800 according to Operation Example 2 of Embodiment 2. Measurement apparatus 800 illustrated in FIG. 13 measures an EVM of a measurement-target transmission apparatus that transmits a DFT-S-OFDM signal (e.g., transmission apparatus 400 illustrated in FIG. 8).

Note that, in FIG. 13, components that are similar to the components in Embodiment 1 (FIG. 10) are assigned the same reference numerals and their descriptions are omitted. More specifically, measurement apparatus 800 illustrated in FIG. 13 further includes CPE/ICI corrector 801 in addition to the components that are similar to the components of measurement apparatus 600 illustrated in FIG. 10.

CPE/ICI corrector 801 estimates the CPE/ICI of an input signal, using a PT-RS contained in the signal input from IDFT section 604, and corrects (performs CPE correction/ICI correction on) the input signal based on the result of estimation as in reception apparatus 500 (CPE/ICI corrector 505).

Note that, as in Embodiment 1, data EVM measurer 605 measures an EVM, using the signal input from IDFT section 604. Moreover, control-signal EVM determiner 608 measures an EVM, using the signal input from channel equalizer 603 as in Embodiment 1. More specifically, in Embodiment 2, data EVM measurer 605 assumes a point after the IDFT processing but before CPE/ICI correction in reception apparatus 500 (EVM measurement point) and measures an EVM. Moreover, control-signal EVM measurer 607 assumes a point after the FFT processing and channel equalization in reception apparatus 500 (EVM measurement point) and measures an EVM.

Data EVM determiner 606 and control-signal EVM determiner 608 determine whether or not CPE/ICI correction is present in reception apparatus 500 and switch between the EVM requirement values (e.g., see FIG. 11) to be used in EVM determination, based on the result of determination.

Data EVM determiner 606 and control-signal EVM determiner 608, for example, may check whether or not use of a PT-RS is indicated (i.e., whether or not a PT-RS is contained in a signal from transmission apparatus 400) and switch between the EVM requirement values to be used in EVM determination, in accordance with the result of checking as in reception apparatus 500 (PT-RS checker 504). Alternatively, data EVM determiner 606 and control-signal EVM determiner 608 may switch between the EVM requirement values to be used in EVM determination, in accordance with a transmission parameter (such as frequency band or modulation order) used for a signal transmitted from transmission apparatus 400, as in Embodiment 1. Note that, information indicating whether or not a PT-RS is used or information on the frequency band or the modulation order to be used for the signal may be indicated explicitly or implicitly using a control signal and/or the like.

Alternatively, in Embodiment 2, measurement apparatus 800 (measurement apparatus having a CPE/ICI correction feature) may perform EVM determination for transmission apparatus 400 that requires CPE/ICI correction, and measurement apparatus 600 (measurement apparatus having no CPE/ICI correction feature) described in Embodiment 1 may perform EVM determination for transmission apparatus 400 that requires no CPE/ICI correction.

As described above, measurement apparatus 800 switches between EVM requirement values to be used in EVM determination, in accordance with necessity of CPE/ICI correction (whether or not CPE/ICI correction is present).

Accordingly, measurement apparatus 800 can appropriately evaluate an EVM measurement value according to whether or not CPE/ICI correction is considered necessary. More specifically, measurement apparatus 800 can perform EVM determination, taking into account the CPE/ICI correction (improvement of EVM) in reception apparatus 500 for transmission apparatus 400 for which CPE/ICI correction is considered necessary. More specifically, measurement apparatus 800 can allow for communication for transmission apparatus 400 having the phase noise not allowed under the current test standard, using a test standard that takes into account the improvement of an EVM by the CPE/ICI correction in reception apparatus 500.

As described above, measurement-target transmission apparatus 400 for which the CPE/ICI correction is considered necessary can perform communication using the modulation scheme with reception apparatus 500 provided with a CPE/ICI correction feature, in a case where a requirement by the EVM requirement value (b) of the case where CPE/ICI correction is necessary illustrated in FIG. 11 is satisfied in EVM determination by measurement apparatus 800.

Moreover, measurement-target transmission apparatus 400 can use local oscillator 406 which produces a phase noise that may not be allowed under the current test standard in the case where the CPE/ICI correction is considered necessary. Stated differently, transmission apparatus 400 does not have to include a high performance local oscillator for suppressing production of the phase noise to an extent allowable under the current test standard even in the case where the CPE/ICI correction is considered necessary. Thus, an increase in configuration or costs of local oscillator 406 provided to transmission apparatus 400 can be prevented.

Operation Examples 1 and 2 of Embodiment 2 have been described thus far.

As described above, in Embodiment 2, as with the current test standard in measurement apparatuses 700 and 800, an EVM having no effect of CPE/ICE correction (EVM before CPE/ICI correction) is measured while an EVM requirement value taking into account the CPE/ICI correction in reception apparatuses 200 and 500 (i.e., new test standard) is configured. In a case where CPE/ICI correction is determined to be necessary for a signal transmitted from transmission apparatuses 100 and 400, measurement apparatuses 700 and 800 perform EVM determination for transmission apparatuses 100 and 400 based on the new test standard, respectively.

Thus, according to Embodiment 2, measurement apparatuses 700 and 800 can each appropriately determine an EVM measurement value, taking into account the CPE/ICI correction.

Moreover, according to Embodiment 2, switching between the EVM requirement values in measurement apparatuses 700 and 800 according to whether or not the CPE/ICI correction in reception apparatuses 200 and 500 is necessary allows transmission apparatuses 100 and 400 (base station or mobile station) to include a local oscillator producing a phase noise that may not be allowed under the current test standard. More specifically, transmission apparatuses 100 and 400 (base station or mobile station) do not have to include a high performance local oscillator to be allowed under the current test standard.

Furthermore, measurement apparatuses 700 and 800 determine whether or not the new test standard is applied in EVM determination based on whether or not the CPE/ICI correction is necessary in reception apparatuses 200 and 500 for a signal transmitted from transmission apparatuses 100 and 400. Thus, measurement apparatuses 700 and 800 can each appropriately perform EVM determination in both cases where the CPE/ICI correction is necessary and where the CPE/ICI correction is unnecessary.

Embodiment 3

In Embodiments 1 and 2, the case has been described where a measurement apparatus measures an EVM having no effect of CPE/ICI correction (EVM before CPE/ICI correction) as in the current test standard. Meanwhile, in Embodiment 3, a case will be described where a measurement apparatus measures an EVM having the effect of CPE/ICI correction (EVM after CPE/ICI correction).

Hereinafter, a description will be given of a configuration of a communication system using a CP-OFDM scheme in Operation Example 1 and a configuration of a communication system using a DFT-S-OFDM scheme in Operation Example 2 in a manner similar to Embodiment 1.

Operation Example 1

A transmission apparatus and a reception apparatus according to Embodiment 3 include basic configurations common to transmission apparatus 100 and reception apparatus 200 according to Embodiment 1, so that a description will be given while FIGS. 3 and 4 are incorporated herein.

[Configuration of Measurement Apparatus]

Figure 14:
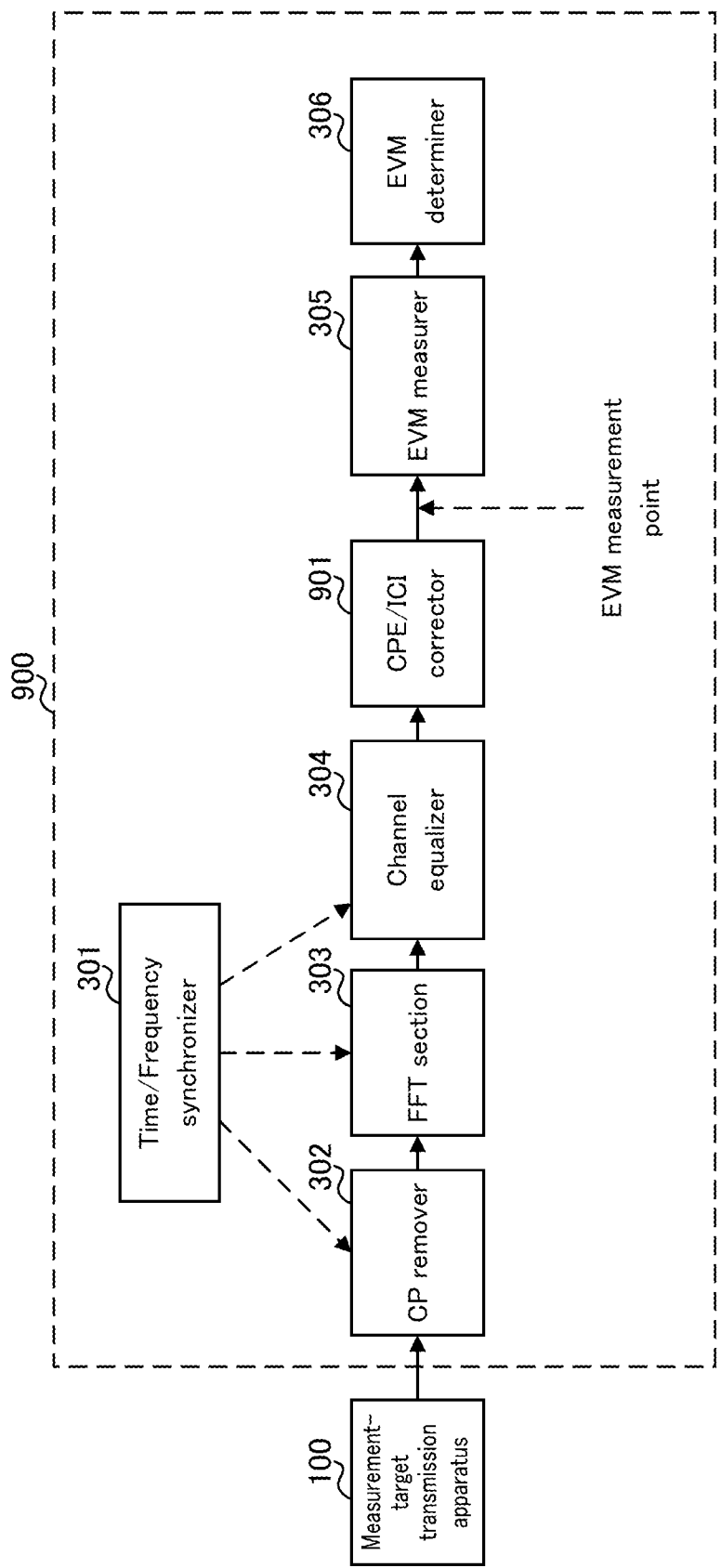
FIG. 14 is a block diagram illustrating a configuration of a measurement apparatus according to Operation Example 1 of Embodiment 3.

FIG. 14 is a block diagram illustrating a configuration of measurement apparatus 900 according to Operation Example 1 of Embodiment 3. Measurement apparatus 900 illustrated in FIG. 14 measures an EVM of a measurement-target transmission apparatus that transmits a CP-OFDM signal (e.g., transmission apparatus 100 illustrated in FIG. 3).

Note that, in FIG. 14, components that are similar to the components in Embodiment 1 (FIG. 5) are assigned the same reference numerals and their descriptions are omitted. More specifically, measurement apparatus 900 illustrated in FIG. 14 further includes CPE/ICI corrector 901 in addition to the components that are similar to the components of measurement apparatus 300 illustrated in FIG. 5.

CPE/ICI corrector 901 estimates the CPE/ICI of an input signal, using a PT-RS contained in the signal input from channel equalizer 304 and corrects (performs CPE correction/ICI correction on) the input signal based on the result of estimation as in reception apparatus 200 (CPE/ICI corrector 205). CPE/ICI corrector 901 outputs the signal obtained after the CPE/ICI correction to EVM measurer 305.

EVM measurer 305 measures an EVM, using the signal input from CPE/ICI corrector 901 (signal after CPE/ICI correction). More specifically, in Embodiment 3, EVM measurer 305 assumes a point after FFT processing, channel equalization, and CPE/ICI correction in reception apparatus 200 (EVM measurement point) and measures an EVM.

Note that, CPE/ICI corrector 901, for example, may check whether or not use of a PT-RS is indicated (i.e., whether or not a PT-RS is contained in the signal from transmission apparatus 100) and determine whether or not to perform CPE/ICI correction, in accordance with the result of checking as in reception apparatus 200 (PT-RS checker 204). More specifically, CPE/ICI corrector 901 outputs the signal input from channel equalizer 304 to EVM measurer 305 without performing CPE/ICI correction in a case where no PT-RS is used. Alternatively, CPE/ICI corrector 901 may check whether or not to perform CPE/ICI correction in accordance with a transmission parameter (such as frequency band or modulation order) used for the signal transmitted from transmission apparatus 100, as in Embodiment 1. Note that, information indicating whether or not a PT-RS is used or information on the frequency band or modulation order to be used for the signal may be indicated explicitly or implicitly using a control signal and/or the like.

EVM determiner 306 determines whether or not the EVM measurement value input from EVM measurer 305 satisfies a prescribed requirement (whether or not the EVM measurement value is equal to or less than the EVM requirement value).

FIG. 15 illustrates examples of EVM requirement values used in EVM determination by EVM determiner 306 according to Embodiment 3. The EVM requirement values illustrated in FIG. 15 are identical to the EVM requirement values (a) of the case where CPE/ICI correction is unnecessary illustrated in FIG. 6 as an example. Note that, the EVM requirement values used in Embodiment 3 are not limited to be the same as the EVM requirement values illustrated in FIG. 6.

As illustrated in FIG. 15, EVM determiner 306 performs EVM determination using the same EVM requirement value regardless of whether or not CPE/ICI correction is necessary. More specifically, in a case where CPE/ICI correction is unnecessary, EVM determiner 306 determines whether or not the EVM measurement value measured using the signal from transmission apparatus 100 is equal to or less than the EVM requirement value illustrated in FIG. 15 as with the current test standard. Meanwhile, in a case where CPE/ICI correction is necessary, EVM determiner 306 determines whether or not the EVM measurement value measured using the signal obtained after the CPE/ICI correction is performed on the signal from transmission apparatus 100 is equal to or less than the EVM requirement value illustrated in FIG. 15.

More specifically, in a case where CPE/ICI correction is necessary, measurement apparatus 900 can evaluate an EVM taking into account the CPE/ICI correction by performing EVM measurement using the signal obtained after the CPE/ICI correction. More specifically, measurement apparatus 900 improves the EVM as in reception apparatus 200 by performing CPE/ICI correction in a case where CPE/ICI correction is necessary, thereby performing EVM determination, using the same standard (the same EVM requirement value) as that of the case where CPE/ICI correction is unnecessary.

As described above, measurement apparatus 900 can perform CPE/ICI correction similar to that performed by reception apparatus 200, so that measurement apparatus 900 can allow for communication under the current test standard even for transmission apparatus 100 having a phase noise not allowed under the current test standard when CPE/ICI correction is not taken into account.

In the manner described above, measurement-target transmission apparatus 100 for which the CPE/ICI correction is considered necessary can perform communication using the modulation scheme with reception apparatus 200 provided with a CPE/ICI correction feature, in a case where a requirement by the EVM requirement value illustrated in FIG. 15 is satisfied in EVM determination by measurement apparatus 900.

In addition, measurement-target transmission apparatus 100 can use local oscillator 106 which produces a phase noise that may not be allowed under the current test standard in a case where the CPE/ICI correction is necessary. Stated differently, transmission apparatus 100 does not have to include a high performance local oscillator for suppressing a production of the phase noise to an extent allowable under the current test standard even in the case where the CPE/ICI correction is necessary. Thus, an increase in configuration or costs of local oscillator 106 provided to transmission apparatus 100 can be prevented.

Note that, in Embodiment 3, measurement apparatus 900 (measurement apparatus having a CPE/ICI correction feature) may perform EVM measurement for transmission apparatus 100 that requires CPE/ICI correction, and measurement apparatus 300 (measurement apparatus having no CPE/ICI correction feature) described in Embodiment 1 may perform EVM measurement for transmission apparatus 100 that requires no CPE/ICI correction.

Operation Example 2

A transmission apparatus and a reception apparatus according to Embodiment 3 include basic configurations common to transmission apparatus 400 and reception apparatus 500 according to Embodiment 1, so that a description will be given while FIGS. 8 and 9 are incorporated herein.

[Configuration of Measurement Apparatus]

Figure 16:
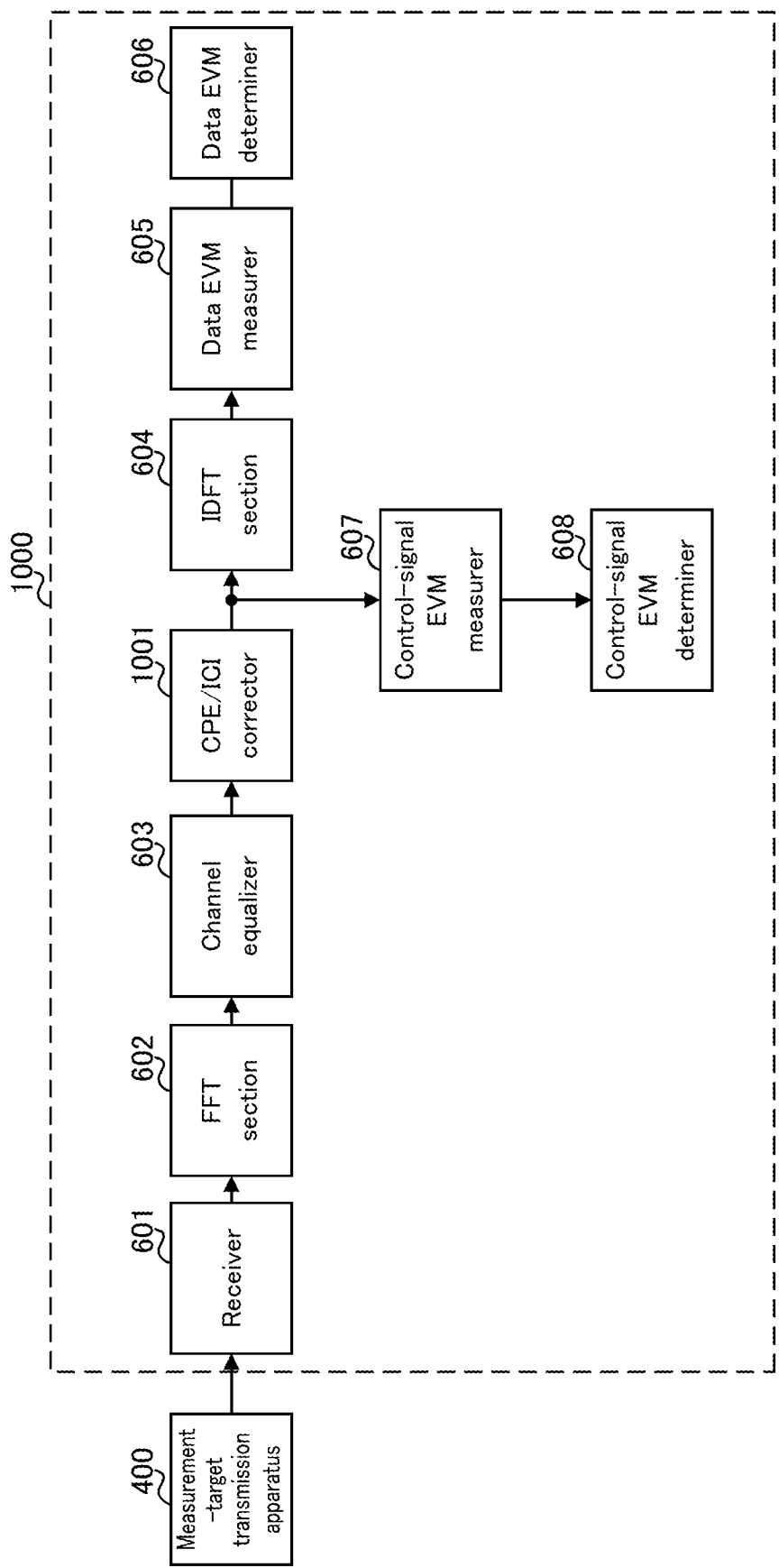
FIG. 16 is a block diagram illustrating a configuration of a measurement apparatus according to Operation Example 2 of Embodiment 3.

FIG. 16 is a block diagram illustrating a configuration of measurement apparatus 1000 according to Operation Example 2 of Embodiment 3. Measurement apparatus 1000 illustrated in FIG. 16 measures an EVM of a measurement-target transmission apparatus that transmits a DFT-S-OFDM signal (e.g., transmission apparatus 400 illustrated in FIG. 8).

Note that, in FIG. 16, components that are similar to the components in Embodiment 1 (FIG. 10) are assigned the same reference numerals and their descriptions are omitted. More specifically, measurement apparatus 1000 illustrated in FIG. 16 further includes CPE/ICI corrector 1001 in addition to the components that are similar to the components of measurement apparatus 600 illustrated in FIG. 10.

CPE/ICI corrector 1001 estimates the CPE/ICI of an input signal, using a PT-RS contained in the signal input from channel equalizer 603, and corrects (performs CPE correction/ICI correction on) the input signal based on the result of estimation as in reception apparatus 500 (CPE/ICI corrector 505). CPE/ICI corrector 1001 outputs the signal obtained after the CPE/ICI correction to IDFT section 604 and control-signal EVM measurer 607.

IDFT section 604 applies IDFT processing to the signal input from CPE/ICI corrector 1001 (signal after CPE/ICI correction) and data EVM measurer 605 measures an EVM, using the signal obtained by the IDFT processing. Moreover, control-signal EVM measurer 607 measures an EVM, using the signal input from CPE/ICI corrector 1001 (signal after CPE/ICI correction). More specifically, in Embodiment 3, data EVM measurer 605 assumes a point after the CPE/ICI correction and IDFT processing in reception apparatus 500 (EVM measurement point) and measures an EVM. Moreover, control-signal EVM measurer 607 assumes a point after FFT processing, channel equalization, and CPE/ICI correction in reception apparatus 500 (EVM measurement point) and measures an EVM.

Note that, CPE/ICI corrector 1001 may check whether or not use of a PT-RS is indicated (i.e., whether or not a PT-RS is contained in the signal from transmission apparatus 400) and determine whether or not to perform CPE/ICI correction in accordance with the result of checking as in reception apparatus 500 (PT-RS checker 504). More specifically, CPE/ICI corrector 1001 outputs the signal input from channel equalizer 603 without performing CPE/ICI correction in a case where no PT-RS is used. Furthermore, CPE/ICI corrector 1001 may check whether or not to perform CPE/ICI correction in accordance with a transmission parameter (such as frequency band or modulation order) used for the signal transmitted from transmission apparatus 400, as in Embodiment 1. Note that, information indicating whether or not a PT-RS is used or information on the frequency band or the modulation order to be used for the signal may be indicated explicitly or implicitly using a control signal and/or the like.

Data EVM determiner 606 and control-signal EVM determiner 608 determine whether or not the EVM measurement values respectively input from data EVM measurer 605 and control-signal EVM measurer 607 satisfy a prescribed requirement (whether or not the EVM measurement value is equal to or less than the EVM requirement value).

FIG. 17 illustrates examples of EVM requirement values used in EVM determination by data EVM determiner 606 and control-signal EVM determiner 608 according to Embodiment 3. The EVM requirement values illustrated in FIG. 17 are identical to the EVM requirement values (a) of the case where CPE/ICI correction is unnecessary illustrated in FIG. 11 as an example. Note that, the EVM requirement values used in Embodiment 3 are limited to be the same as the EVM requirement values illustrated in FIG. 11.

As illustrated in FIG. 17, data EVM determiner 606 and control-signal EVM determiner 608 perform EVM determination, using the same EVM requirement value regardless of whether or not CPE/ICI correction is necessary. More specifically, in a case where CPE/ICI correction is unnecessary, data EVM determiner 606 and control-signal EVM determiner 608 determine whether or not the EVM measurement value measured using the signal from transmission apparatus 400 is equal to or less than the EVM requirement value illustrated in FIG. 17 as with the current test standard. Meanwhile, in a case where CPE/ICI correction is necessary, data EVM determiner 606 and control-signal EVM determiner 608 determine whether or not the EVM measurement value measured using the signal obtained after the CPE/ICI correction is performed on the signal from transmission apparatus 400 is equal to or less than the EVM requirement value illustrated in FIG. 17.

More specifically, in a case where CPE/ICI correction is necessary, measurement apparatus 1000 can evaluate an EVM taking into account the CPE/ICI correction by performing EVM measurement using the signal obtained after the CPE/ICI correction. In other words, measurement apparatus 1000 improves the EVM by performing CPE/ICI correction as in reception apparatus 500 in a case where CPE/ICI correction is necessary, thereby performing EVM determination using the same standard (the same EVM requirement value) as that of the case where CPE/ICI correction is unnecessary.

As described above, measurement apparatus 1000 can perform CPE/ICI correction similar to that performed by reception apparatus 500, so that measurement apparatus 1000 can allow for communication under the current test standard even for transmission apparatus 400 having a phase noise not allowed under the current test standard when CPE/ICI correction is not taken into account.

In the manner described above, measurement-target transmission apparatus 400 for which the CPE/ICI correction is considered necessary can perform communication using the modulation scheme with reception apparatus 500 provided with a CPE/ICI correction feature in a case where a requirement by the EVM requirement value illustrated in FIG. 17 is satisfied in EVM determination by measurement apparatus 1000.

In addition, measurement-target transmission apparatus 400 can use local oscillator 406 which produces a phase noise that may not be allowed under the current test standard in a case where the CPE/ICI correction is necessary. Stated differently, transmission apparatus 400 does not have to include a high performance local oscillator for suppressing production of the phase noise to an extent allowable under the current test standard even in the case where the CPE/ICI correction is necessary. Thus, an increase in configuration or costs of local oscillator 406 provided to transmission apparatus 400 can be prevented.

Note that, in Embodiment 3, measurement apparatus 1000 (measurement apparatus having a CPE/ICI correction feature) may perform EVM measurement for transmission apparatus 100 that requires CPE/ICI correction, and measurement apparatus 600 (measurement apparatus having no CPE/ICI correction feature) described in Embodiment 1 may perform EVM measurement for transmission apparatus 100 that requires no CPE/ICI correction.

Operation Examples 1 and 2 of Embodiment 3 have been described thus far.

As described above, in Embodiment 3, measurement apparatuses 900 and 1000 measure an EVM having the effect of CPE/ICI correction (EVM after CPE/ICI correction). Measurement apparatuses 900 and 1000 then perform, regardless of whether or not CPE/ICI correction is necessary for a signal transmitted from transmission apparatuses 100 and 400, EVM determination for transmission apparatuses 100 and 400 based on the same test standard (e.g., similar to the current test standard).

Thus, according to Embodiment 3, measurement apparatuses 900 and 1000 can appropriately determine an EVM measurement value, taking into account the CPE/ICI correction.

Moreover, according to Embodiment 3, performing, in measurement apparatuses 900 and 1000, CPE/ICI correction in a case where CPE/ICI correction is necessary in reception apparatuses 200 and 500 allows transmission apparatuses 100 and 400 (base station or mobile station) to include a local oscillator producing a phase noise that may not be allowed under the current test standard. More specifically, transmission apparatuses 100 and 400 (base station or mobile station) do not have to include a high performance local oscillator to be allowed under the current test standard.

Furthermore, measurement apparatuses 900 and 1000 determine whether or not to perform CPE/ICI correction before EVM measurement, based on whether or not CPE/ICI correction is necessary in reception apparatuses 200 and 500 for a signal transmitted from transmission apparatuses 100 and 400. Thus, measurement apparatuses 900 and 1000 can appropriately perform EVM determination in both cases where CPE/ICI correction is necessary and where CPE/ICI correction is unnecessary.

Each embodiment of the present disclosure has been described thus far.

Note that, the term "CPE/ICI correction" used in the embodiments means "correcting a CPE" or "correcting ICI," or "correcting both a CPE and ICI."

Moreover, in the embodiments described above, a phase noise may be produced not only from a local oscillator of a transmission apparatus but also from a local oscillator of a reception apparatus (not illustrated).

In addition, in the embodiments described above, channel equalization refers to processing that estimates a change in amplitude and/or phase of a signal during spatial channel propagation between a transmission apparatus and a reception apparatus, using a DMRS, and that corrects the amplitude and/or phase of the received signal based on the result of estimation. The channel equalization does not include processing of CPE/ICI correction using a PT-RS.

Furthermore, in the embodiments described above, the components of antenna (not illustrated) ends are "CP removers 201 and 302" in the block diagrams illustrating the configurations of measurement apparatuses 300, 700, and 900 for CP-OFDM, and reception apparatus 200 (FIGS. 4, 5, 12, and 14). Meanwhile, the components of antenna (not illustrated) ends are "receivers 501 and 601" in the block diagrams illustrating the configurations of measurement apparatuses 600, 800, and 1000 for DFT-S-OFDM, and reception apparatus 500 (FIGS. 9, 10, 13, and 16). This is because the block diagrams are made to correspond to the block diagrams described in the current test standard (e.g., see NPLs 3 and 4), and not to make a point about uniqueness in these portions. Stated differently, the components of the reception antennas ends in the measurement apparatuses and the reception apparatuses described in the above embodiments are not limited to the components of the block diagrams mentioned above, and may include a component corresponding to a component of a transmission antenna end of a transmission apparatus. The same applies to the presence or absence of "time/frequency synchronizer 301" in measurement apparatuses 300, 600, 700, 800, 900, and 1000.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

A measurement apparatus of the present disclosure includes: measurement circuitry, which, in operation, measures a modulation quality of a signal transmitted from a transmission apparatus; and determination circuitry, which, in operation, determines whether or not a measurement value of the modulation quality is equal to or less than a first requirement value, in a case where correction relating to a phase noise of the transmission apparatus is necessary in a reception apparatus, the first requirement value being higher than a second requirement value used in the determination of the measurement value in a case where the correction relating to the phase noise of the transmission apparatus is unnecessary in the reception apparatus.

In the measurement apparatus of the present disclosure, the determination circuitry determines whether or not the measurement value is equal to or less than the first requirement value, in a case where a frequency band to which the signal is assigned is not less than a threshold, and determines whether or not the measurement value is equal to or less than the second requirement value, in a case where the frequency band to which the signal is assigned is less than the threshold.

In the measurement apparatus of the present disclosure, the determination circuitry determines whether or not the measurement value is equal to or less than the first requirement value, in a case where a modulation order used for the signal is not less than a threshold, and determines whether or not the measurement value is equal to or less than the second requirement value, in a case where the modulation order used for the signal is less than the threshold.

In the measurement apparatus of the present disclosure, the determination circuitry determines whether or not the measurement value is equal to or less than the first requirement value, in a case where a phase tracking reference signal is contained in the signal, and determines whether or not the measurement value is equal to or less than the second requirement value, in a case where the reference signal is not contained in the signal.

A measurement apparatus of the present disclosure includes: correction circuitry, which, in operation, performs correction relating to a phase noise for a signal transmitted from a transmission apparatus; measurement circuitry, which, in operation, measures a modulation quality of the signal after the correction relating to the phase noise; and determination circuitry, which, in operation, determines whether or not a measurement value of the modulation quality is equal to or less than a requirement value.

A measurement method of the present disclosure includes: measuring a modulation quality of a signal transmitted from a transmission apparatus; and determining whether or not a measurement value of the modulation quality is equal to or less than a first requirement value, in a case where correction relating to a phase noise of the transmission apparatus is necessary in a reception apparatus, the first requirement value being higher than a second requirement value used in the determining of the measurement value in a case where the correction relating to the phase noise of the transmission apparatus is unnecessary in the reception apparatus.

INDUSTRIAL APPLICABILITY

An aspect of this disclosure is useful in mobile communication systems.

REFERENCE SIGNS LIST

100, 400 Transmission apparatus
101, 402 PT-RS generator
102, 403 DMRS generator
103, 404 Mapping section
104, 405 IFFT section
105 CP adder
106, 406 Local oscillator
107, 407 Frequency converter
108, 408 Antenna
200, 500 Reception apparatus
201, 302 CP remover
202, 303, 502, 602 FFT section
203, 304, 503, 603 Channel equalizer
204, 504 PT-RS checker
205, 505, 701, 801, 901, 1001, CPE/ICI corrector
206 Symbol detector
300, 600, 700, 800, 900, 1000 Measurement apparatus
301 Time/Frequency synchronizer
305 EVM measurer
306 EVM determiner
401 DFT section
501, 601 Receiver
506, 604 IDFT section
605 Data EVM measurer
606 Data EVM determiner
607 Control-signal EVM measurer
608 Control-signal EVM determiner

The invention claimed is:

1. A communication apparatus comprising:
measurement circuitry, which, in operation, obtains a measurement value of a signal transmitted from a transmission apparatus; and
determination circuitry, which, in operation, compares the measurement value with a first requirement value in a case where a phase tracking reference signal is contained in the signal, and compares the measurement value with a second requirement value in a case where the phase tracking reference signal is not contained in the signal, the first requirement value being higher than the second requirement value.

2. A communication apparatus comprising:
circuitry, which, in operation, generates a phase tracking reference signal; and
a transmitter, which, in operation, transmits a signal,
wherein a first requirement value that is compared with a measurement value of the signal in a case where the phase tracking reference signal is contained in the signal is higher than a second requirement value that is compared with the measurement value of the signal in a case where the phase tracking reference signal is not contained in the signal.

3. A communication method comprising:
obtaining a measurement value of a signal transmitted from a transmission apparatus; and
comparing the measurement value with a first requirement value in a case where a phase tracking reference signal is contained in the signal, and comparing the measurement value with a second requirement value in a case where the phase tracking reference signal is not contained in the signal, the first requirement value being higher than the second requirement value.

4. A communication method comprising:
generating a phase tracking reference signal; and
transmitting a signal,
wherein a first requirement value that is compared with a measurement value of the signal in a case where the phase tracking reference signal is contained in the signal is higher than a second requirement value that is compared with the measurement value of the signal in a case where the phase tracking reference signal is not contained in the signal.

* * * * *